United States Patent
Qiao et al.

(10) Patent No.: US 10,063,355 B2
(45) Date of Patent: Aug. 28, 2018

(54) DATA PROCESSING METHOD, APPARATUS, AND SYSTEM

(71) Applicant: Huawei Technologies Co., Ltd., Shenzhen (CN)

(72) Inventors: Deli Qiao, Shenzhen (CN); Ye Wu, Shanghai (CN); Yan Chen, Shanghai (CN); Lei Wang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 66 days.

(21) Appl. No.: 15/192,832

(22) Filed: Jun. 24, 2016

(65) Prior Publication Data
US 2016/0308646 A1 Oct. 20, 2016

Related U.S. Application Data

(63) Continuation of application No. PCT/CN2013/090504, filed on Dec. 26, 2013.

(51) Int. Cl.
*H04W 84/08* (2009.01)
*H04L 5/00* (2006.01)
(Continued)

(52) U.S. Cl.
CPC ............ *H04L 5/0023* (2013.01); *H04L 1/00* (2013.01); *H04L 5/0051* (2013.01); *H04W 72/042* (2013.01)

(58) Field of Classification Search
None
See application file for complete search history.

(56) References Cited

U.S. PATENT DOCUMENTS

2004/0121810 A1* 6/2004 Goransson ........... H04B 7/0408
455/562.1
2010/0195615 A1 8/2010 Lee et al.
(Continued)

FOREIGN PATENT DOCUMENTS

CN 102088429 A 6/2011
CN 102170646 A 8/2011
(Continued)

OTHER PUBLICATIONS

Motorola, "DL Single Cell MU-MIMO: DM-RS Ports / Scrambling Sequence Design," 3GPP TSG RAN1 #60bis, R1-102140, Apr. 12-16, 2010, pp. 1-5, Beijing, China.

*Primary Examiner* — Edan Orgad
*Assistant Examiner* — Sithu Ko
(74) *Attorney, Agent, or Firm* — Slater Matsil, LLP

(57) ABSTRACT

The present disclosure provides a data processing method, apparatus, and system. The method includes: receiving N data streams sent by a network-side device, and determining a demodulation reference signal DMRS corresponding to each of the N data streams. The method also includes grouping DMRSs corresponding to the N data streams into M groups; mapping each group of DMRSs in the M groups to corresponding resource element (RE) positions, and acquiring port-related information corresponding to each group of DMRSs. The method further includes sending the port-related information corresponding to each group of DMRSs to a terminal device; adding each group of DMRSs in the M groups to data streams; and sending the data streams to which the DMRSs are added to the terminal device.

20 Claims, 14 Drawing Sheets

(51) Int. Cl.
*H04L 1/00* (2006.01)
*H04W 72/04* (2009.01)

(56) References Cited

U.S. PATENT DOCUMENTS

| | | | | |
|---|---|---|---|---|
| 2011/0103324 A1* | 5/2011 | Nam | ............... | H04L 5/0048 |
| | | | | 370/329 |
| 2012/0300670 A1 | 11/2012 | Sun et al. | | |
| 2012/0300709 A1* | 11/2012 | Su | ............... | H04L 5/0037 |
| | | | | 370/328 |
| 2013/0070732 A1* | 3/2013 | Noh | ............... | H04L 5/0016 |
| | | | | 370/335 |
| 2013/0265951 A1 | 10/2013 | Ng et al. | | |
| 2013/0265955 A1 | 10/2013 | Kim et al. | | |

FOREIGN PATENT DOCUMENTS

| | | |
|---|---|---|
| CN | 102447524 A | 5/2012 |
| CN | 102857459 A | 1/2013 |
| WO | 2012048629 A1 | 4/2012 |

\* cited by examiner

DATA PROCESSING METHOD, APPARATUS, AND SYSTEM

CROSS-REFERENCE TO RELATED APPLICATIONS

This application is a continuation of International Application No. PCT/CN2013/090504, filed on Dec. 26, 2013, which is hereby incorporated by reference in its entirety.

TECHNICAL FIELD

The present disclosure relates to the communications field, and in particular embodiments, to a data processing method, apparatus, and system.

BACKGROUND

In an Long Term Evolution Advanced (LTE-A) system, to improve spectral efficiency, Multiple-user Multiple-Input Multiple-Output (MU-MIMO) processing may be performed on data streams. That is, a base station may simultaneously transmit data to multiple User Equipment (UEs), or simultaneously receive data transmitted by multiple UEs, and these UEs reuse a same time-frequency resource. In this case, the user equipment performs channel estimation by using a Demodulation Reference Signal (DMRS) in a downlink reference signal, so that the UE successfully demodulates the data.

In a current 3rd Generation Partnership Project (3GPP) LTE-A standard, a DMRS design scheme supporting eight data streams occupies 24 REs, where orthogonal cover code for DMRS code division multiplexing of every four data streams is 4. The base station sends DMRSs by using eight DMRS ports. After receiving DMRS messages, the UE obtains channel estimation according to the DMRSs, so as to demodulate data.

In a process of implementing the foregoing data processing, the prior art has at least the following problem. When a large-scale antenna system can support more than eight data streams, the base station sends DMRSs in a non-orthogonal manner, so as to reduce time-frequency resources occupied by the DMRSs. Because the base station sends the DMRSs in the non-orthogonal manner, interference between the DMRSs is relatively large, and therefore accuracy in channel estimation performed by a user is reduced.

SUMMARY

Embodiments of the present invention provide a data processing method, apparatus, and system, which are used to reduce interference between DMRSs and improve accuracy in channel estimation performed by a user.

To achieve the foregoing objective, the following technical solutions are used in the embodiments of the present invention.

According to a first aspect, an embodiment of the present invention provides a data processing method, and the method includes: receiving N data streams sent by a network-side device, where the data stream carries a user identity ID, and N is an integer greater than a quantity of demodulation reference signal DMRS ports of a base station; generating a DMRS corresponding to each of the N data streams; grouping DMRSs corresponding to the N data streams into M groups; mapping each group of DMRSs in the M groups to corresponding resource element (RE) positions, and acquiring port-related information corresponding to each group of DMRSs; sending the port-related information corresponding to each group of DMRSs to a terminal device; and adding each group of DMRSs in the M groups to data streams, and sending the data streams to which the DMRSs are added to the terminal device.

According to a second aspect, an embodiment of the present invention provides a base station, and the base station includes a receiving unit, a processing unit, an acquiring unit, and a sending unit, where the receiving unit is configured to receive N data streams sent by a network-side device, where the data stream carries a user identity ID, and N is an integer greater than a quantity of demodulation reference signal DMRS ports of the base station; the processing unit is configured to generate a DMRS corresponding to each of the N data streams; the processing unit is further configured to group DMRSs corresponding to the N data streams into M groups; the processing unit is further configured to map each group of DMRSs in the M groups to corresponding resource element (RE) positions; the acquiring unit is configured to acquire port-related information corresponding to each group of DMRSs; the sending unit is configured to send the port-related information corresponding to each group of DMRSs to a terminal device; and the sending unit is further configured to add each group of DMRSs in the M groups to data streams, and send the data streams to which the DMRSs are added to the terminal device.

According to a third aspect, an embodiment of the present invention provides a terminal device, and the terminal device includes a receiving unit and a processing unit, where the receiving unit is configured to receive port-related information corresponding to demodulation reference signals DMRSs; the processing unit is configured to obtain, according to the port-related information corresponding to the DMRSs, a sequence of resource element (RE) positions in which the DMRSs are located; the receiving unit is further configured to receive data streams, where each of the data streams carries a DMRS; the processing unit is further configured to acquire, according to the sequence of RE positions, the DMRSs carried in the data streams; and the processing unit is further configured to acquire, according to the DMRSs, channel estimation corresponding to the DMRSs, and demodulate the data streams according to the channel estimation corresponding to the DMRSs.

According to a fourth aspect, an embodiment of the present invention provides a base station, and the base station includes a receiver, a processor, and a transmitter, where the receiver is configured to receive N data streams sent by a network-side device, where the data stream carries a user identity ID, and N is an integer greater than a quantity of demodulation reference signal DMRS ports of the base station; the processor is configured to generate a DMRS corresponding to each of the N data streams; the processor is further configured to group DMRSs corresponding to the N data streams into M groups; the processor is further configured to map each group of DMRSs in the M groups to corresponding resource element (RE) positions; the processor is further configured to acquire port-related information corresponding to each group of DMRSs; the transmitter is configured to send the port-related information corresponding to each group of DMRSs to a terminal device; and the transmitter is further configured to add each group of DMRSs in the M groups to data streams, and send the data streams to which the DMRSs are added to the terminal device.

According to the fifth aspect, an embodiment of the present invention provides a terminal device, and the terminal device includes a receiver and a processor, where the receiver is configured to receive port-related information corresponding to demodulation reference signals DMRSs; the processor is configured to obtain, according to the port-related information corresponding to the DMRSs, a sequence of resource element (RE) positions in which the DMRSs are located; the receiver is further configured to receive data streams, where each of the data streams carries a DMRS; the processor is further configured to acquire, according to the sequence of RE positions, the DMRSs carried in the data streams; and the processor is further configured to acquire, according to the DMRSs, channel estimation corresponding to the DMRSs, and modulate the data streams according to the channel estimation corresponding to the DMRSs.

According to a sixth aspect, an embodiment of the present invention provides a data processing system, and the system includes a base station and a terminal device, where the base station is the base station described in the foregoing embodiment, and the terminal device is the terminal device described in the foregoing embodiment.

According to the data processing method, apparatus, and system provided in the embodiments of the present invention, after receiving data streams sent by a network-side device, a base station needs to generate DMRS information corresponding to each data stream; then groups DMRSs corresponding to the data streams according to a particular method, and maps the grouped DMRSs to corresponding resource element (RE) positions; and finally sends an RE position sequence and the data streams to which the DMRSs are added to a terminal device. In this way, when a quantity of data streams is greater than a quantity of DMRS ports of the base station, the base station may group DMRSs according to a particular method, and send DMRSs in different groups to a terminal by using the data streams, thereby reducing interference between the DMRSs and improving accuracy in channel estimation performed by a user without increasing time-frequency resources occupied by the DMRSs.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present disclosure.

Figure 1:
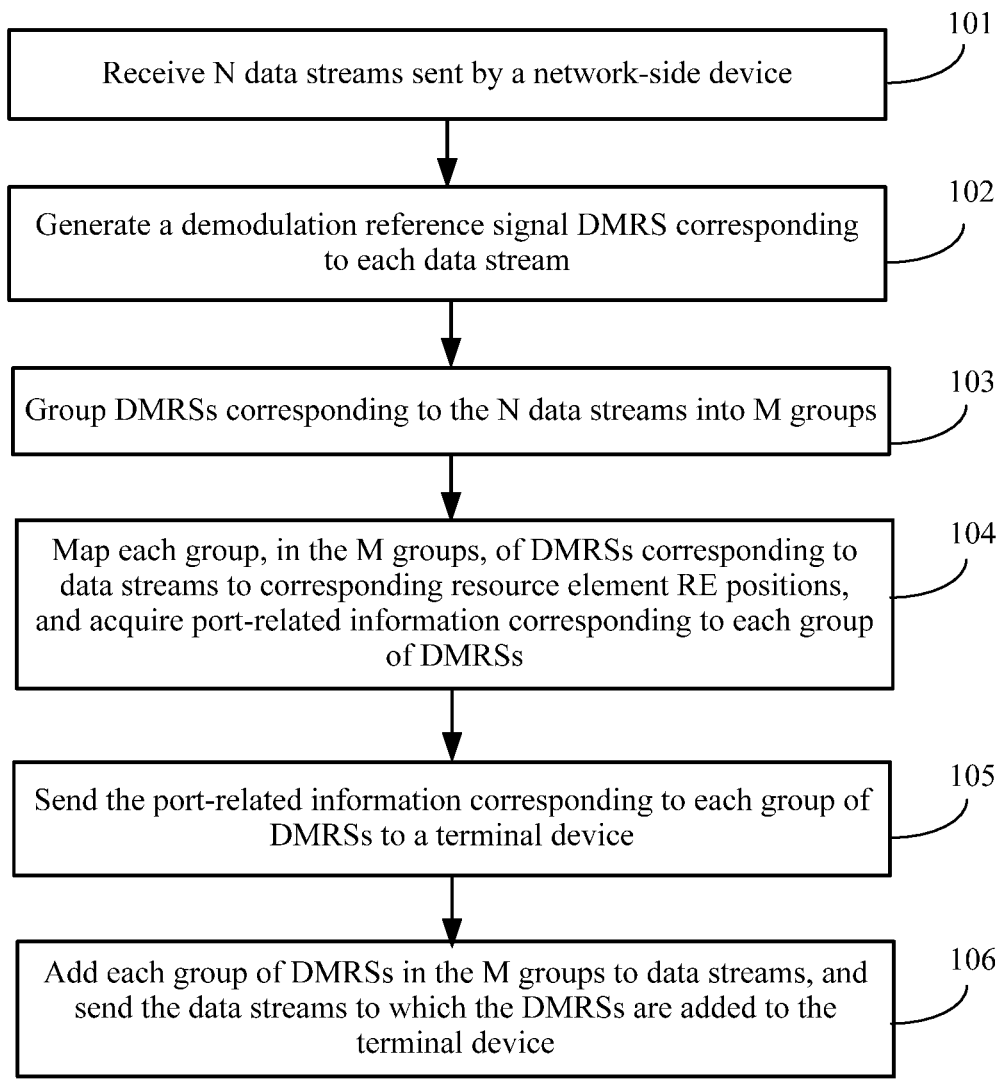
FIG. 1 is a schematic flowchart of a data processing method according to an embodiment of the present invention.

An embodiment of the present invention provides a data processing method, and as shown in FIG. 1, the method includes the following steps.

101. Receive N data streams sent by a network-side device.

The data stream carries a user identity (ID), and N is an integer greater than a quantity of Demodulation Reference Signal (DMRS) ports of a base station.

When a network side needs to send the data streams to a terminal device, the network side may send the data streams to the base station that serves the terminal device, and the base station sends the data streams to the terminal device. In this case, the base station receives the data streams that are transmitted from the network side and need to be transmitted by the base station to the terminal device served by the base station.

It should be noted that because all the data streams need to be transmitted to the terminal device, for one terminal device, the terminal device may receive one data stream, or may simultaneously receive multiple data streams.

It should be noted that the data stream carries the user ID, that is, a terminal device to which the data stream needs to be transmitted can be learned according to the data stream.

It should be noted that N is an integer greater than the quantity of DMRS ports of the base station, that is, at least one DMRS port of the base station needs to be used to send multiple data streams.

102. Generate a DMRS corresponding to each of the N data streams.

After receiving the N data streams, the base station obtains, according to a preset DMRS generation rule, the DMRS corresponding to each of the N data streams.

It should be noted that the DMRS generation rule may be the same as that in the prior art, or may be another rule in which a DMRS can be generated by using a data stream, which is not limited in the present disclosure.

103. Group DMRSs corresponding to the N data streams into M groups.

It should be noted that M is a value of a group quantity that is preset by the base station for grouping the DMRSs.

Further, after acquiring first information of each data stream, the base station groups the DMRSs corresponding to the N data streams into the M groups according to the first information and a grouping rule.

It should be noted that before step 103, the base station needs to acquire the first information of each of the N data streams according to the user ID, where the first information is related information used for grouping the DMRSs.

Further, the first information includes channel estimation and/or angle-of-arrival information of the terminal device.

Further, a grouping rule in which the base station groups the DMRSs corresponding to the N data streams into M groups varies with a specific case of the first information.

In a first case in which the first information includes the channel estimation, the grouping rule may be a grouping rule based on channel relevance. In this case, there are two methods for grouping, according to the first information of each data stream, the DMRSs corresponding to the N data streams into the M groups, which are specifically as follows.

Figure 2A:
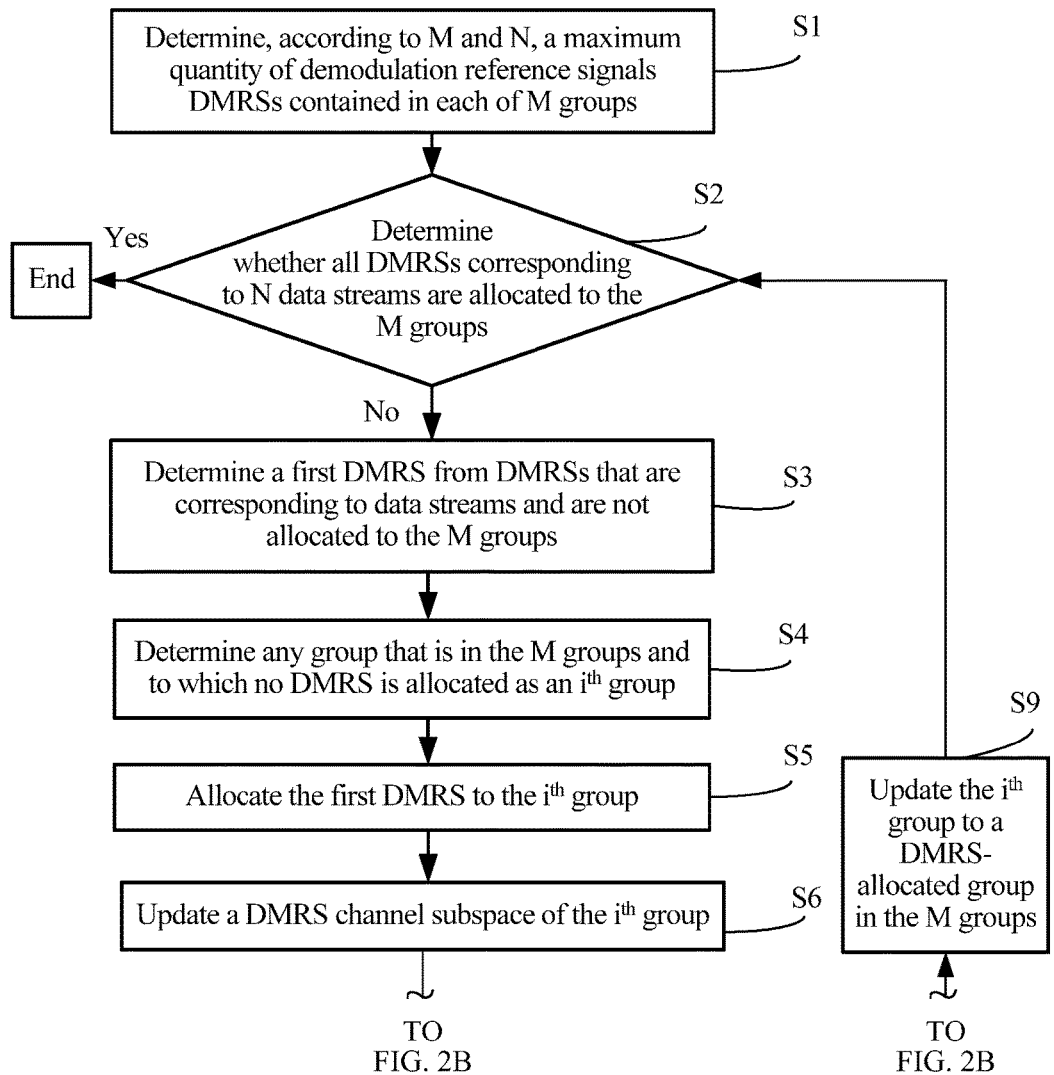
FIG. 2A and FIG. 2B are a schematic flowchart of grouping DMRSs corresponding to N data streams into M groups according to an embodiment of the present invention.
Figure 2B:
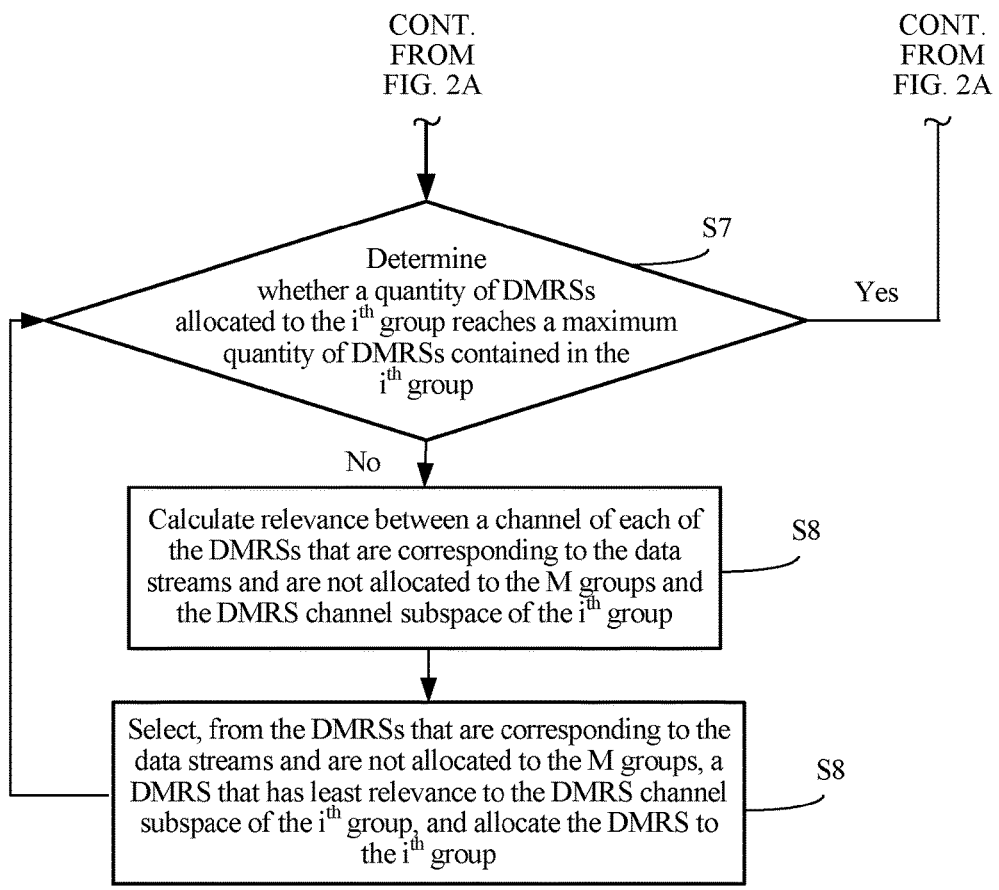

A first method is shown in FIG. 2A and FIG. 2B, and includes the following steps.

S1. Determine, according to a value of a group quantity M and a quantity N of the data streams, a maximum quantity of DMRSs contained in each of the M groups.

It should be noted that during grouping, the base station needs to maintain an average quantity of DMRSs in each group.

Assuming that N is 16, and M is 4, that is, DMRSs corresponding to 16 data streams need to be grouped into four groups, quantities of DMRSs in all of the four groups are respectively 4, 4, 4, and 4.

Assuming that N is 14, and M is 4, that is, DMRSs corresponding to 14 data streams need to be grouped into four groups, quantities of DMRSs in all of the four groups are respectively 4, 4, 3, and 3.

S2. Determine whether all the DMRSs corresponding to the N data streams are allocated to the M groups.

S3. If it is determined that all the DMRSs corresponding to the N data streams are not allocated to the M groups, determine a first DMRS from DMRSs that are corresponding to data streams and are not allocated to the M groups.

In a case in which the base station determines that the DMRSs corresponding to all the data streams are not yet allocated to all the groups, it indicates that there are still DMRSs that are corresponding to data streams and are not grouped, and the base station selects, from the DMRSs that are corresponding to the data streams and are not yet grouped, a DMRS corresponding to one data stream as the first DMRS.

Optionally, the base station may randomly select, from the DMRSs that are corresponding to the data streams and are not grouped, a DMRS corresponding to one data stream as the first DMRS.

Optionally, the base station may determine, from the DMRSs that are corresponding to the data streams and are not grouped, a DMRS that is corresponding to a data stream and whose channel strength is lowest as the first DMRS.

Further, before the base station determines the DMRS that is corresponding to the data stream and whose channel strength is lowest as the first DMRS, the base station needs to acquire, according to channel estimation of each data stream, channel strength of the DMRS corresponding to each data stream. That is, before performing step S3, the base station needs to acquire, according to the channel estimation of each data stream, the channel strength of the DMRS corresponding to each data stream.

It should be noted that the base station may also select, according to other information and from the DMRSs that are corresponding to the data streams and are not grouped, a DMRS corresponding to one data stream as the first DMRS, which is not limited in the present disclosure.

It should be noted that in a case in which the base station determines that the DMRSs corresponding to all the data streams are already allocated to all the groups, it indicates that the DMRSs corresponding to all the data streams are already grouped, and grouping ends.

S4. Determine any group that is in the M groups and to which no DMRS is allocated as an $i^{th}$ group.

The base station randomly selects one group from groups to which no DMRS is allocated yet, and sets the group as the current $i^{th}$ group.

S5. Allocate the first DMRS to the $i^{th}$ group.

The $i^{th}$ group is any group that is in the M groups and to which no DMRS is allocated.

After determining the first DMRS, the base station allocates the determined first DMRS to any group that is in the M groups and to which no DMRS is allocated yet.

It should be noted that the first DMRS is a DMRS that is corresponding to the first data stream and is allocated to the $i^{th}$ group.

S6. Update a DMRS channel subspace of the $i^{th}$ group according to a channel of the first DMRS.

After determining the first DMRS, the base station can first acquire a transmission channel between the user and the base station, that is, the channel of the first DMRS, according to a user ID carried in the data stream corresponding to the first DMRS. Then, the base station combines the channel of the first DMRS with a channel of a DMRS already allocated to the group in which the first DMRS is located, so as to form a new DMRS channel subspace of the group in which the first DMRS is located.

Further, because the first DMRS is the DMRS that is corresponding to the first data stream and is allocated to the $i^{th}$ group, in this case, only the channel of the first DMRS exists in the DMRS channel subspace that is of the $i^{th}$ group and is updated by the base station.

S7. Determine whether a quantity of DMRSs allocated to the $i^{th}$ group reaches a maximum quantity of DMRSs contained in the $i^{th}$ group.

In step S1, the base station already determines a maximum value of the quantity of DMRSs that can be contained in the $i^{th}$ group. After one DMRS is allocated to the $i^{th}$ group, the base station may determine whether the quantity of DMRSs allocated to the $i^{th}$ group reaches the determined maximum value of the quantity of DMRSs that can be contained in the $i^{th}$ group.

It should be noted that the base station performs different steps according to different results of the determining. If the quantity of DMRSs allocated to the $i^{th}$ group does not reach the maximum quantity of DMRSs contained in the $i^{th}$ group, step S8 is performed; or if the quantity of DMRSs allocated to the $i^{th}$ group reaches the maximum quantity of DMRSs contained in the $i^{th}$ group, step S9 is performed.

S8. If the quantity of DMRSs allocated to the $i^{th}$ group does not reach the maximum quantity of DMRSs contained in the $i^{th}$ group, calculate relevance between a channel of each of the DMRSs that are corresponding to the data streams and are not allocated to the M groups and the DMRS channel subspace of the $i^{th}$ group; select, according to the relevance between the channel of each of the DMRSs that are corresponding to the data streams and are not allocated to the M groups and the DMRS channel subspace of the $i^{th}$ group and from the DMRSs that are corresponding to the data streams and are not allocated to the M groups, a DMRS that is corresponding to a data stream and has least relevance to the DMRS channel subspace of the $i^{th}$ group, and allocate the DMRS to the $i^{th}$ group; and continue to perform the determining whether a quantity of DMRSs allocated to the $i^{th}$ group reaches a maximum quantity of DMRSs contained in the $i^{th}$ group, until the quantity of DMRSs allocated to the $i^{th}$ group reaches the maximum quantity of DMRSs contained in the $i^{th}$ group.

It should be noted that in a case in which the base station determines that the quantity of DMRSs allocated to the $i^{th}$ group does not yet reach the determined maximum value of the quantity of DMRSs that can be contained in the $i^{th}$ group, the base station needs to continue to select a DMRS from the unallocated DMRSs and allocate the DMRS to the $i^{th}$ group until the quantity of DMRSs allocated to the $i^{th}$ group reaches the determined maximum value of the quantity of DMRSs that can be contained in the $i^{th}$ group, that is, until allocation to the $i^{th}$ group is completed.

Specifically, in a case in which the base station determines that the quantity of DMRSs allocated to the $i^{th}$ group does not yet reach the determined maximum value of the quantity of DMRSs that can be contained in the $i^{th}$ group, the base station calculates the relevance between the channel of each DMRS that is corresponding to a data stream and is in the unallocated DMRSs corresponding to the data streams and the subspace formed by the channel of the DMRS already allocated to the $i^{th}$ group. The base station selects, according to a result obtained by means of calculation, the DMRS that is corresponding to the data stream and has least relevance to the subspace formed by the channel of the DMRS already allocated to the $i^{th}$ group, and allocates the selected DMRS corresponding to the data stream to the $i^{th}$ group. The base station adds a channel of the DMRS corresponding to the data stream to the subspace formed by the channel of the DMRS already allocated to the $i^{th}$ group. In this case, because another new DMRS corresponding to a data stream is allocated to the $i^{th}$ group, it is necessary to jump to a step of determining whether the quantity of DMRSs allocated to the $i^{th}$ group reaches the maximum quantity of DMRSs contained in the $i^{th}$ group, that is, step S7. In this way, if it is determined in step S7 that the quantity of DMRSs allocated to the $i^{th}$ group does not reach the maximum quantity of DMRSs contained in the $i^{th}$ group, step S8 is performed next, so as to form a cycle of allocating a DMRS corresponding to a data stream to the $i^{th}$ group until the quantity of DMRSs allocated to the $i^{th}$ group reaches the maximum quantity of DMRSs contained in the $i^{th}$ group.

It should be noted that during grouping, the base station needs to minimize relevance between channels of DMRSs in each group as much as possible, so as to minimize interference between the DMRSs in the group.

Further, the base station calculates the relevance between a channel matrix of each of the DMRSs that are corresponding to the data streams and are not allocated to the M groups and the DMRS channel subspace of the $i^{th}$ group according to a formula $h_k P^H (PP^H)^{-1} Ph_{kH}/|h_k|^2$, where $h_k$ represents the channel matrix of each of the DMRSs that are corresponding to the data streams and are not allocated to the M groups, $h_{kH}$ represents a transposed matrix of the channel matrix of each of the DMRSs that are corresponding to the data streams and are not allocated to the M groups, P represents a matrix of the DMRS channel subspace of the $i^{th}$ group, and $P^H$ represents a transposed matrix of the matrix of the DMRS channel subspace of the $i^{th}$ group. Alternatively, the base station may calculate, according to a formula $$\sum_{i=1}^{S} \frac{|h_k p_i^H|}{|h_k|},$$

the relevance between a channel matrix of each of the DMRSs that are corresponding to the data streams and are not allocated to the M groups and the DMRS channel subspace of the $i^{th}$ group, where $h_k$ represents the channel matrix of each of the DMRSs that are corresponding to the data streams and are not allocated to the M groups, S represents a quantity of basis vectors of the channel subspace, $p_i$ is the $i^{th}$ basis vector corresponding to the channel subspace, and in this case, P is an orthogonalized channel subspace, that is, $PP^H=I$, and I is an identity matrix. A specific formula used for calculating the relevance between the channel matrix of each of the DMRSs that are corresponding to the data streams and are not allocated to the M groups and the DMRS channel subspace of the $i^{th}$ group is not limited in the present disclosure.

S9. If the quantity of DMRSs allocated to the $i^{th}$ group reaches the maximum quantity of DMRSs contained in the $i^{th}$ group, update the $i^{th}$ group to a DMRS-allocated group in the M groups, and continue to perform the determining whether all the DMRSs corresponding to the N data streams are allocated to the M groups, until it is determined that all the DMRSs corresponding to the N data streams are allocated to the M groups.

In a case in which the base station determines that the quantity of DMRSs allocated to the $i^{th}$ group reaches the determined maximum value of the quantity of DMRSs that can be contained in the $i^{th}$ group, it indicates that allocation to the $i^{th}$ group is already completed, and then the base station adds the $i^{th}$ group to a group for which allocation is already completed. By using the foregoing steps, all or some of the DMRSs that are corresponding to the data streams and are not allocated to the M groups may be allocated to the $i^{th}$ group. After DMRS allocation to the $i^{th}$ group is completed, it is necessary to detect whether there is a DMRS that is corresponding to a data stream and is not grouped. In this case, the step of determining whether all the DMRSs corresponding to the N data streams are allocated to the M groups needs to be performed until it is determined that all the DMRSs corresponding to the N data streams are allocated to the M groups. That is, after adding the $i^{th}$ group to the group for which allocation is already completed, that is, after completing DMRS allocation to one group, the base station jumps to step S2. When determining that all the DMRSs corresponding to the N data streams are not allocated to the M groups, the base station may continue to perform steps S3-S9, so as to form a cycle of determining the $i^{th}$ group and allocating, to the $i^{th}$ group, the DMRSs that are corresponding to the data streams and are not allocated to the M groups, until it is determined that all the DMRSs corresponding to the N data streams are allocated to the M groups.

In the following example, it is assumed that there are DMRSs corresponding to three data streams, which are respectively a DMRS1, a DMRS2, and a DMRS3, and it is assumed that a group quantity that is preset by the base station for grouping is 2. The base station first determines that a maximum quantity of DMRSs contained in the first group is 2, and that a maximum quantity of DMRSs contained in the second group is 1. Before grouping starts, the base station first determines that all the DMRSs corresponding to the three data streams are not allocated to the two groups yet. The base station then randomly selects the DMRS2 from the unallocated DMRSs corresponding to the three data streams, and determines the DMRS2 as a first DMRS. Next, the base station randomly selects the first group from the two groups to which no DMRS is allocated, and allocates the DMRS2 to the first group, and updates a DMRS channel subspace of the first group. After adding the DMRS2 to the first group, the base station needs to determine whether a quantity of DMRSs in the first group reaches the maximum quantity of DMRSs contained in the first group. When determining that the current one DMRS in the first group does not reach the maximum of two DMRSs contained in the first group, the base station first calculates relevance between a channel of the DMRS1 and the DMRS channel subspace of the first group, and then calculates relevance between a channel of the DMRS3 and the DMRS channel subspace of the first group according to a formula $h_k P^H (PP^H)^{-1} Ph_{kH}/|h_k|^2$. Assuming that in a result obtained by means of calculation, the relevance between the channel of the DMRS1 and the DMRS channel subspace of the first group is greater than the relevance between the channel of the DMRS3 and the DMRS channel subspace of the first group, the base station selects the DMRS3 that has least relevance to the DMRS channel subspace of the first group and allocates the DMRS3 to the first group. Next, the base station continues to determine whether the quantity of DMRSs in the first group reaches the maximum quantity of DMRSs contained in the first group, and when determining that the two DMRSs in the first group reaches the maximum of two DMRSs contained in the first group, updates the first group to an allocated group. The base station continues to perform determining whether all the DMRSs corresponding to the three data streams are allocated to the two groups, and when determining that all the DMRSs corresponding to the three data streams are not allocated to the two groups yet, determines the DMRS1 from unallocated DMRSs corresponding to data streams as the first DMRS. Then, the base station determines the second group to which no DMRS is allocated, allocates the DMRS1 to the second group, and adds a channel of the DMRS1 to a channel subspace of the second group. Next, the base station determines whether a quantity of DMRSs allocated to the second group reaches the maximum quantity of DMRSs contained in the second group, and when determining that the one DMRS allocated to the second group already reaches the maximum of one DMRS contained in the second group, completes allocation to the second group, and updates the second group to an allocated group. The base station continues to perform the determining whether all the DMRSs corresponding to the three data streams are allocated to the two groups, and when it is determined that all the DMRSs corresponding to the three data streams are already allocated to the two groups, grouping is completed. In this case, DMRSs that are corresponding to data streams and are allocated to the first group are the DMRS2 and the DMRS3, and a DMRS that is corresponding to a data stream and is allocated to the second group is the DMRS1.

Figure 3A:
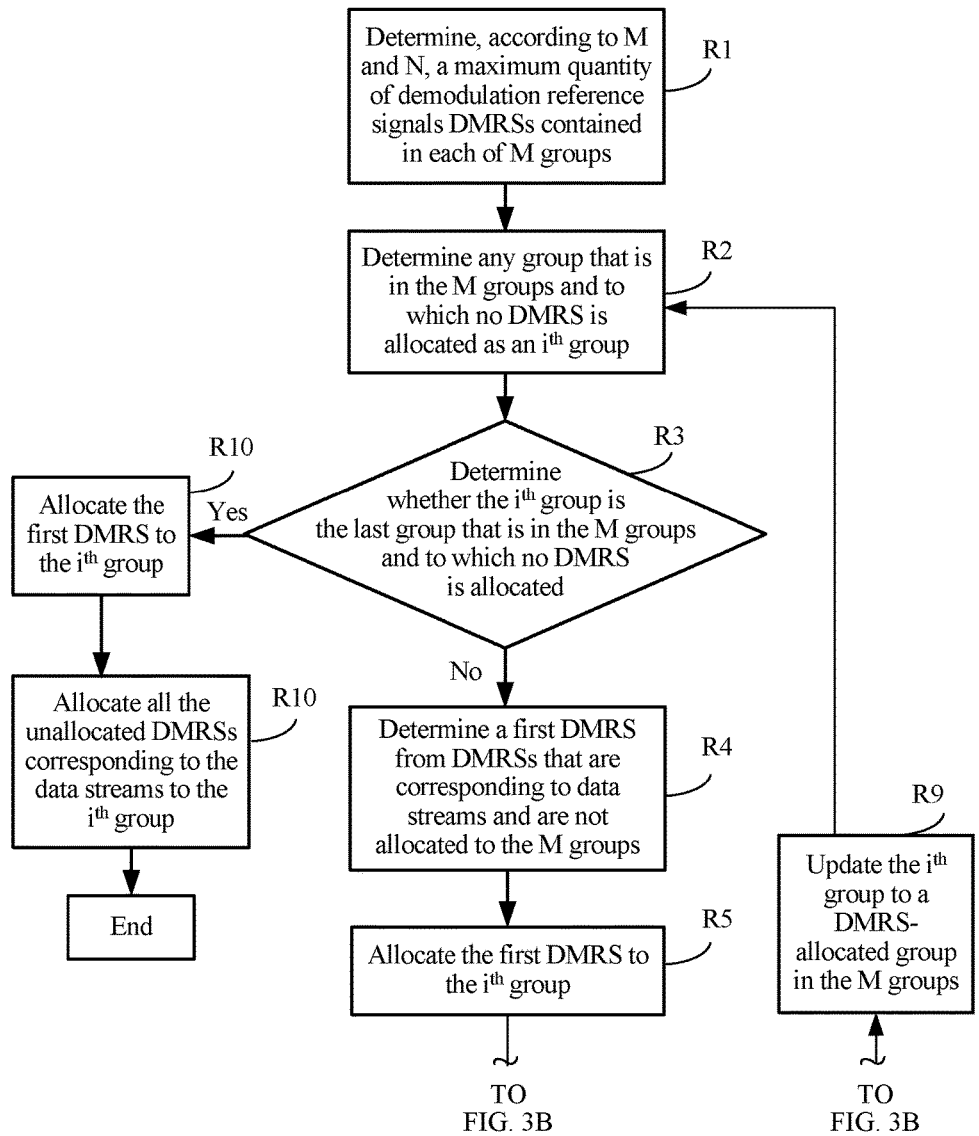
FIG. 3A and FIG. 3B are another schematic flowchart of grouping DMRSs corresponding to N data streams into M groups according to an embodiment of the present invention.
Figure 3B:
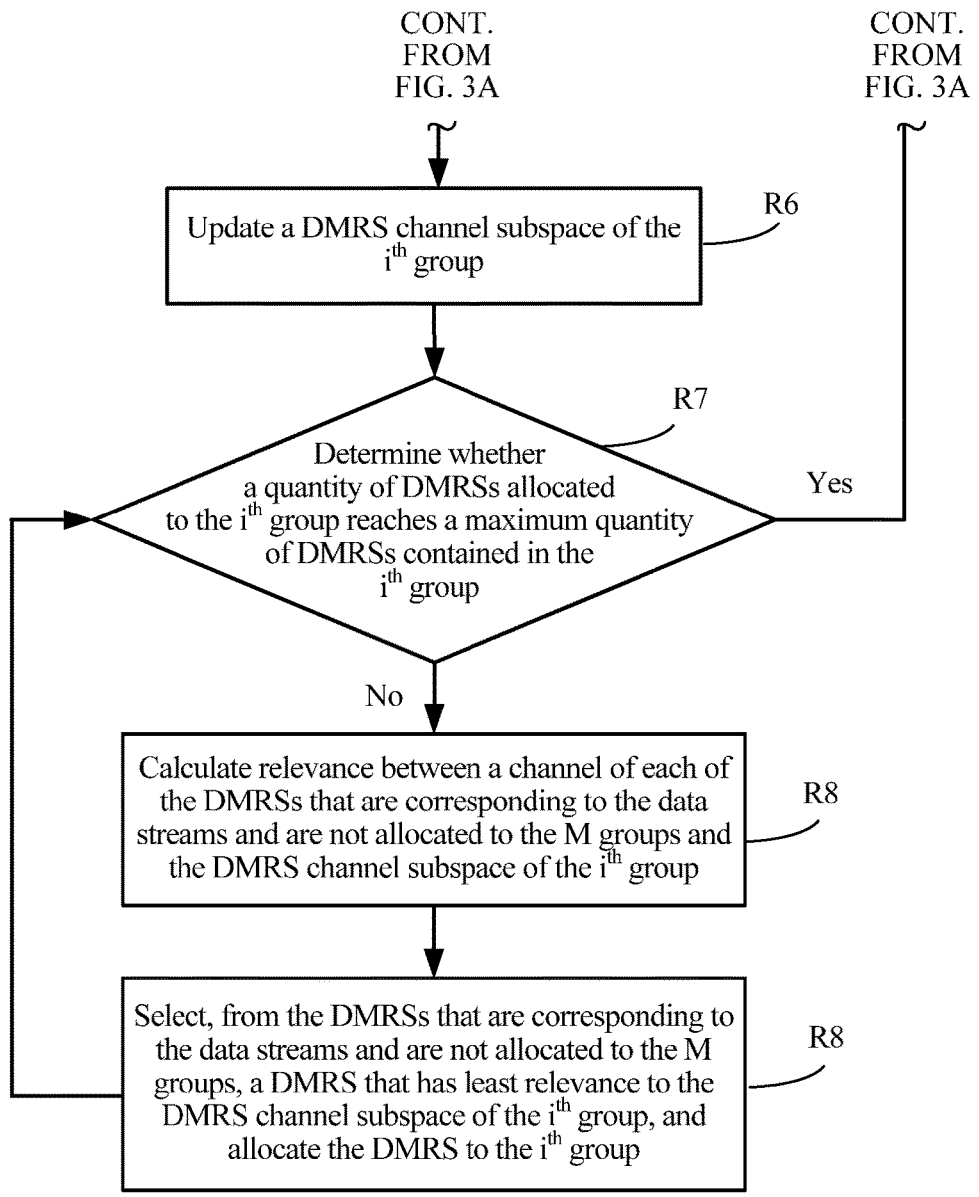

A second method is shown in FIG. 3A and FIG. 3B, and includes the following steps.

R1. Determine, according to a value of a group quantity M and a quantity N of the data streams, a maximum quantity of DMRSs contained in each of the M groups.

Reference may be made to step S1 in the first method in the first case, and details are not described herein again.

R2. Determine any group that is in the M groups and to which no DMRS is allocated as an $i^{th}$ group.

The base station randomly selects one group from groups to which no DMRS is allocated yet, and sets the group as the current $i^{th}$ group.

R3. Determine whether the $i^{th}$ group is the last group that is in the M groups and to which no DMRS is allocated.

Because M is the value of the group quantity that is preset by the base station for grouping the DMRSs, the base station may determine, according to the value of M, whether the current $i^{th}$ group is the last group that is in the M groups and to which no DMRS is allocated.

It should be noted that the base station performs different steps according to different results of the determining. If it is determined that the $i^{th}$ group is not the last group that is in the M groups and to which no DMRS is allocated, steps R4-R9 are performed; or if it is determined that the $i^{th}$ group is the last group that is in the M groups and to which no DMRS is allocated, step R10 is performed.

R4. When it is determined that the $i^{th}$ group is not the last group that is in the M groups and to which no DMRS is allocated, determine a first DMRS from DMRSs that are corresponding to data streams and are not allocated to the M groups.

In a case in which the base station determines that the $i^{th}$ group is not the last group that is in the M groups and to which no DMRS is allocated, the base station needs to select, from the DMRSs that are corresponding to the data streams and are not yet grouped, a DMRS corresponding to one data stream as the first DMRS.

For a process in which the base station selects the first DMRS, refer to a process in which the base station selects the first DMRS in step S3 in the first method in the first case, and details are not described herein again.

R5. Allocate the first DMRS to the $i^{th}$ group.

Reference may be made to step S5 in the first method in the first case, and details are not described herein again.

R6. Update a DMRS channel subspace of the $i^{th}$ group according to a channel of the first DMRS.

Reference may be made to step S6 in the first method in the first case, and details are not described herein again.

R7. Determine whether a quantity of DMRSs allocated to the $i^{th}$ group reaches a maximum quantity of DMRSs contained in the $i^{th}$ group.

In step R1, the base station already determines a maximum value of the quantity of DMRSs that can be contained in the $i^{th}$ group. After one DMRS is allocated to the $i^{th}$ group, the base station may determine whether the quantity of DMRSs allocated to the $i^{th}$ group reaches the determined maximum value of the quantity of DMRSs that can be contained in the $i^{th}$ group.

It should be noted that the base station performs different steps according to different results of the determining. If the quantity of DMRSs allocated to the $i^{th}$ group does not reach the maximum quantity of DMRSs contained in the $i^{th}$ group, step R8 is performed; or if the quantity of DMRSs allocated to the $i^{th}$ group reaches the maximum quantity of DMRSs contained in the $i^{th}$ group, step R9 is performed.

R8. If the quantity of DMRSs allocated to the $i^{th}$ group does not reach the maximum quantity of DMRSs contained in the $i^{th}$ group, calculate relevance between a channel of each of the DMRSs that are corresponding to the data streams and are not allocated to the M groups and the DMRS channel subspace of the $i^{th}$ group; select, according to the relevance between the channel of each of the DMRSs that are corresponding to the data streams and are not allocated to the M groups and the DMRS channel subspace of the $i^{th}$ group and from the DMRSs that are corresponding to the data streams and are not allocated to the M groups, a DMRS that has least relevance to the DMRS channel subspace of the $i^{th}$ group, and allocate the DMRS to the $i^{th}$ group; and continue to perform the determining whether a quantity of DMRSs allocated to the $i^{th}$ group reaches a maximum quantity of DMRSs contained in the $i^{th}$ group, until the quantity of DMRSs allocated to the $i^{th}$ group reaches the maximum quantity of DMRSs contained in the $i^{th}$ group.

Reference may be made to step S8 in the first method in the first case, and details are not described herein again.

R9. If the quantity of DMRSs allocated to the $i^{th}$ group reaches the maximum quantity of DMRSs contained in the $i^{th}$ group, update the $i^{th}$ group to a DMRS-allocated group in the M groups, and continue to perform the determining any group that is in the M groups and to which no DMRS is allocated as an $i^{th}$ group.

In a case in which the base station determines that the quantity of DMRSs allocated to the $i^{th}$ group reaches the determined maximum value of the quantity of DMRSs that can be contained in the $i^{th}$ group, it indicates that allocation to the $i^{th}$ group is already completed, and then the base station adds the $i^{th}$ group to a group for which allocation is already completed. By using the foregoing steps, all or some of the DMRSs that are corresponding to the data streams and are not allocated to the M groups may be allocated to the $i^{th}$ group. After DMRS allocation to the $i^{th}$ group is completed, the step of determining any group that is in the M groups and to which no DMRS is allocated as an $i^{th}$ group needs to be performed until it is determined that DMRSs corresponding to data streams are allocated to all M−1 groups. That is, after DMRS allocation to one group is completed, the base station jumps to step R2. After performing R3, the base station determines that the $i^{th}$ group is not the last group that is in the M groups and to which no DMRS is allocated, and may continue to perform steps R4-R9, so as to form a cycle of determining the $i^{th}$ group and allocating, to the $i^{th}$ group, the DMRSs that are corresponding to the data streams and are not allocated to the M groups, until it is determined that the DMRSs corresponding to the data streams are allocated to all the M−1 groups.

R10. When it is determined that the $i^{th}$ group is the last group that is in the M groups and to which no DMRS is allocated, allocate all unallocated DMRSs corresponding to data streams to the $i^{th}$ group.

When the base station determines that the $i^{th}$ group is the last group to which a DMRS corresponding to a data stream needs to be allocated, it indicates that all the ultimately unallocated DMRSs corresponding to the data streams need to be allocated to the $i^{th}$ group. In this case, the base station does not need to perform steps of determining the first DMRS and sequentially selecting a DMRS corresponding to one data stream to add the DMRS to the $i^{th}$ group, but directly allocates all the unallocated DMRSs corresponding to the data streams to the $i^{th}$ group.

It should be noted that after this step is performed, allocation of DMRSs, corresponding to data streams, to each of the M groups is already completed, which indicates that allocation of all the DMRSs is already completed; therefore, grouping ends.

In the following example, it is assumed that there are DMRSs corresponding to three data streams, which are respectively a DMRS1, a DMRS2, and a DMRS3; and it is assumed that a group quantity that is preset by the base station for grouping is 2. The base station first determines that a maximum quantity of DMRSs contained in the first group is 1, and that a maximum quantity of DMRSs contained in the second group is 2. Before grouping starts, the base station first randomly selects the first group from the two groups to which no DMRS is allocated, and then determines whether the selected first group is the last group that is in the two groups and to which no DMRS is allocated. In this case, the base station determines that the first group is not the last group that is in the two groups and to which no DMRS is allocated. The base station then randomly selects the DMRS2 from the unallocated DMRSs corresponding to the three data streams, and determines the DMRS2 as a first DMRS. The base station allocates the DMRS2 to the first group, and updates a DMRS channel subspace of the first group at the same time. After adding the DMRS2 to the first group, the base station needs to determine whether a quantity of DMRSs in the first group reaches the maximum quantity of DMRSs contained in the first group. When determining that the current one DMRS in the first group already reaches the maximum of one DMRS contained in the first group, the base station completes allocation to the first group, and updates the first group to an allocated group. The base station continues to perform selecting the second group from a group to which no DMRS is allocated, and then determines whether the selected second group is the last group that is in the two groups and to which no DMRS is allocated. In this case, the base station determines that the second group is not the last group that is in the two groups and to which no DMRS is allocated, and allocates the unallocated DMRS1 and DMRS3 to the second group at a time. Grouping is completed. In this case, a DMRS that is corresponding to a data stream and is allocated to the first group is the DMRS2, and DMRSs that are corresponding to data streams and are allocated to the second group are the DMRS1 and the DMRS3.

Figure 4A:
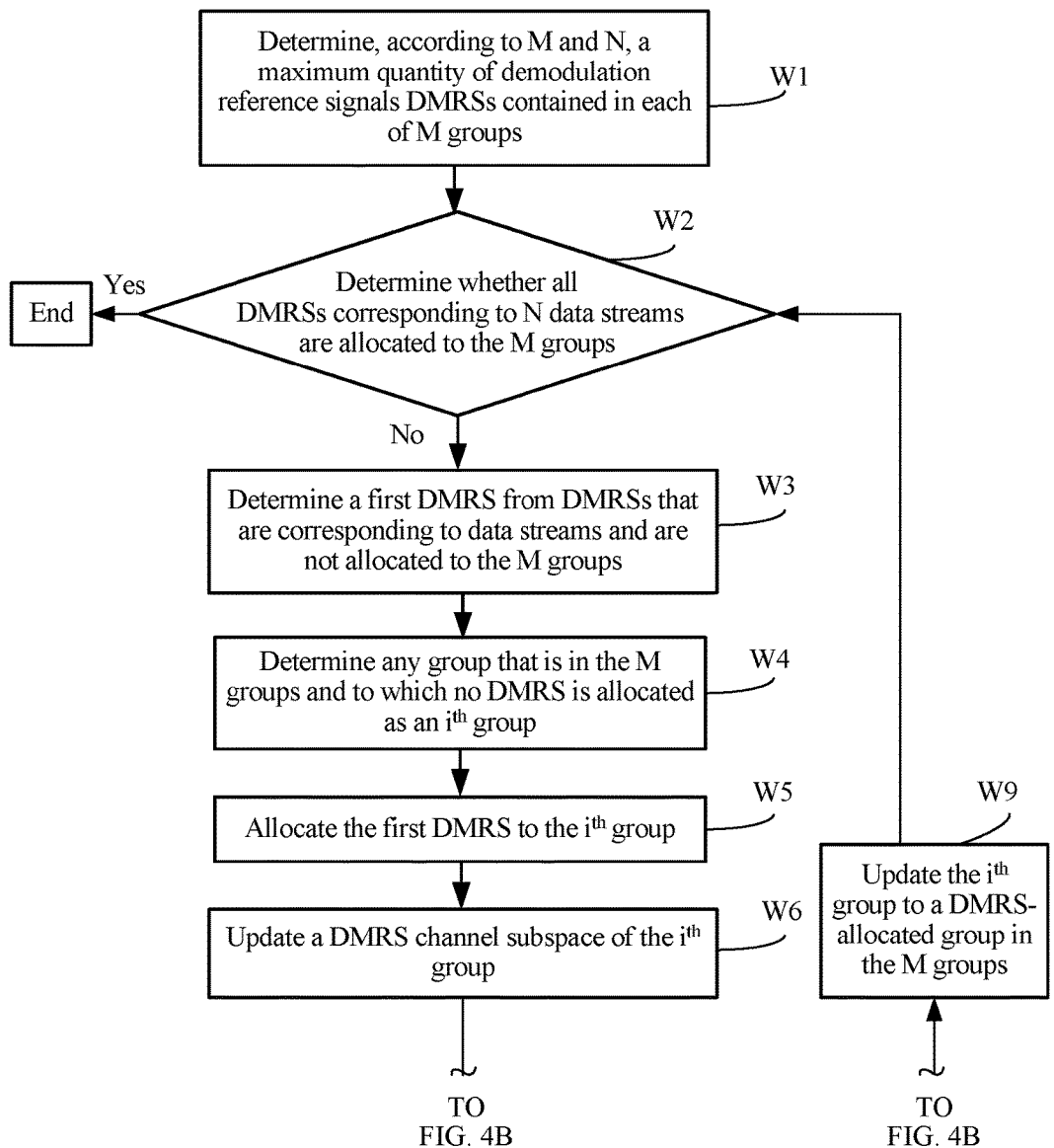
FIG. 4A and FIG. 4B are another schematic flowchart of grouping DMRSs corresponding to N data streams into M groups according to an embodiment of the present invention.
Figure 4B:
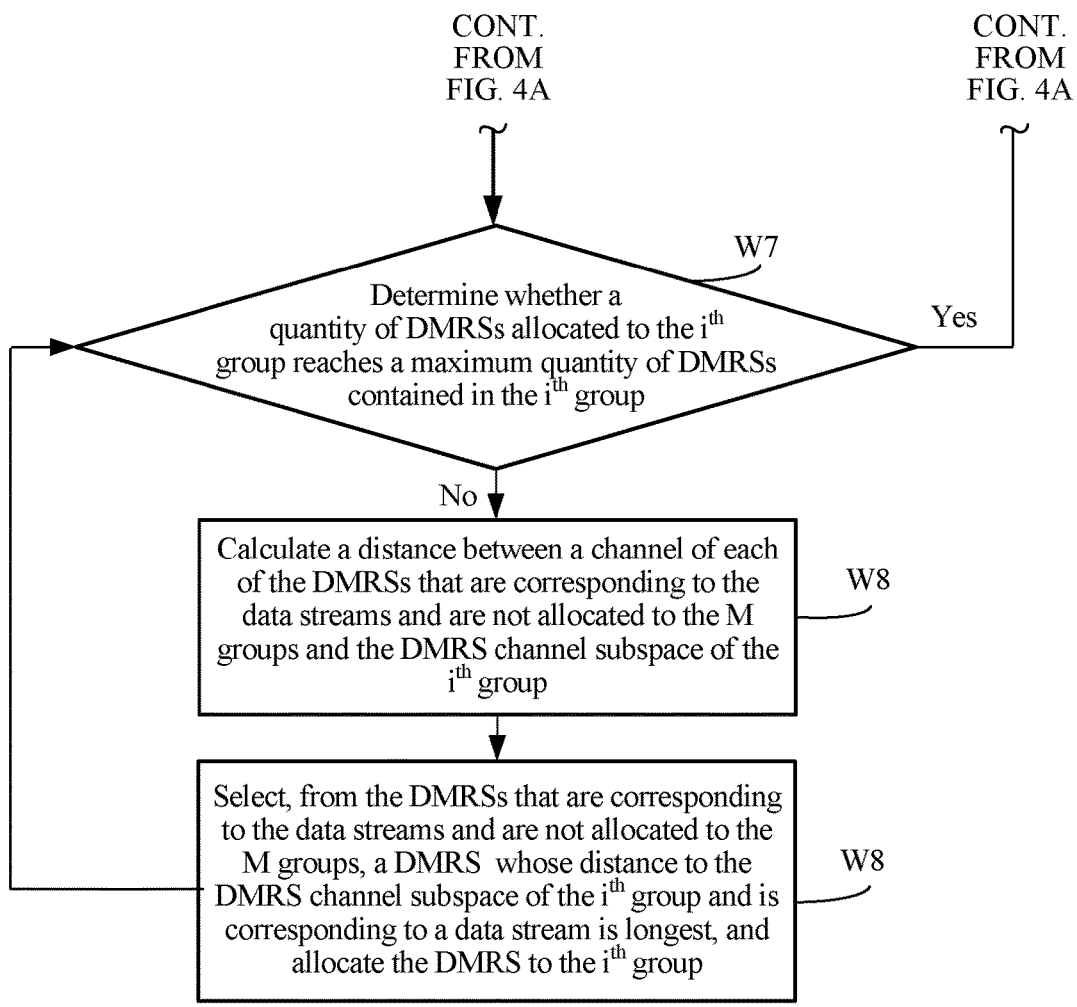

Alternatively, in a second case in which the first information includes the channel estimation, the grouping rule may be a grouping rule based on a channel distance. In this case, there are two methods for grouping, according to the first information of each data stream, the DMRSs corresponding to the N data streams into the M groups, which are specifically as follows:

A first method is shown in FIG. 4A and FIG. 4B, and includes the following steps.

W1. Determine, according to a value of a group quantity M and a quantity N of the data streams, a maximum quantity of DMRSs contained in each of the M groups.

Reference may be made to an implementation manner in which the base station determines the quantity of DMRSs contained in each group in the first case, and details are not described herein again.

W2. Determine whether all the DMRSs corresponding to the N data streams are allocated to the M groups.

Reference may be made to an implementation manner in which the base station determines whether all the DMRSs corresponding to the N data streams are allocated to the M groups in the first case, and details are not described herein again.

W3. If it is determined that all the DMRSs corresponding to the N data streams are not allocated to the M groups, determine a first DMRS from DMRSs that are corresponding to data streams and are not allocated to the M groups.

In a case in which the base station determines that the DMRSs corresponding to all the data streams are not yet allocated to all the groups, it indicates that there are still DMRSs that are corresponding to data streams and are not grouped, and the base station selects, from the DMRSs that are corresponding to the data streams and are not yet grouped, a DMRS corresponding to one data stream as the first DMRS.

Optionally, the base station may randomly select, from the DMRSs that are corresponding to the data streams and are not grouped, a DMRS corresponding to one data stream as the first DMRS.

Optionally, the base station may determine, from the DMRSs that are corresponding to the data streams and are not grouped, a DMRS that is corresponding to a data stream and whose channel strength is highest as the first DMRS.

Further, before the base station determines the DMRS that is corresponding to the data stream and whose channel strength is highest as the first DMRS, the base station needs to acquire, according to channel estimation of each data stream, channel strength of the DMRS corresponding to each data stream. That is, before performing step W3, the base station needs to acquire, according to the channel estimation of each data stream, the channel strength of the DMRS corresponding to each data stream.

It should be noted that the base station may also select, according to other information and from the DMRSs that are corresponding to the data streams and are not grouped, a DMRS corresponding to one data stream as the first DMRS, which is not limited in the present disclosure.

It should be noted that in a case in which the base station determines that the DMRSs corresponding to all the data streams are already allocated to all the groups, it indicates that the DMRSs corresponding to all the data streams are already grouped, and grouping ends.

W4. Determine any group that is in the M groups and to which no DMRS is allocated as an $i^{th}$ group.

The base station randomly selects one group from groups to which no DMRS is allocated yet, and sets the group as the current $i^{th}$ group.

W5. Allocate the first DMRS to the $i^{th}$ group.

The $i^{th}$ group is any group that is in the M groups and to which no DMRS is allocated.

Reference may be made to an implementation manner in which the base station allocates the first DMRS to the $i^{th}$ group in the first case, and details are not described herein again.

W6. Update a DMRS channel subspace of the $i^{th}$ group according to a channel of the first DMRS.

Reference may be made to an implementation manner in which the base station updates the DMRS channel subspace of the $i^{th}$ group in the first case, and details are not described herein again.

W7. Determine whether a quantity of DMRSs allocated to the $i^{th}$ group reaches a maximum quantity of DMRSs contained in the $i^{th}$ group.

Reference may be made to an implementation manner of determining whether the quantity of DMRSs allocated to the $i^{th}$ group reaches the maximum quantity of DMRSs contained in the $i^{th}$ group in the first case, and details are not described herein again.

It should be noted that the base station performs different steps according to different results of the determining. If the quantity of DMRSs allocated to the $i^{th}$ group does not reach the maximum quantity of DMRSs contained in the $i^{th}$ group, step W8 is performed; or if the quantity of DMRSs allocated to the $i^{th}$ group reaches the maximum quantity of DMRSs contained in the $i^{th}$ group, step W9 is performed.

W8. If the quantity of DMRSs allocated to the $i^{th}$ group does not reach the maximum quantity of DMRSs contained in the $i^{th}$ group, calculate a distance between a channel of each of the DMRSs that are corresponding to the data streams and are not allocated to the M groups and the DMRS channel subspace of the $i^{th}$ group; select, according to the distance between the channel of each of the DMRSs that are corresponding to the data streams and are not allocated to the M groups and the DMRS channel subspace of the $i^{th}$ group and from the DMRSs that are corresponding to the data streams and are not allocated to the M groups, a DMRS whose distance to the DMRS channel subspace of the $i^{th}$ group is longest, and allocate the DMRS to the $i^{th}$ group; and continue to perform the determining whether a quantity of DMRSs allocated to the $i^{th}$ group reaches a maximum quantity of DMRSs contained in the $i^{th}$ group, until the quantity of DMRSs allocated to the $i^{th}$ group reaches the maximum quantity of DMRSs contained in the $i^{th}$ group.

It should be noted that in a case in which the base station determines that the quantity of DMRSs allocated to the $i^{th}$ group does not yet reach the determined maximum value of the quantity of DMRSs that can be contained in the $i^{th}$ group, the base station needs to continue to select a DMRS from the unallocated DMRSs and allocate the DMRS to the $i^{th}$ group until the quantity of DMRSs allocated to the $i^{th}$ group reaches the determined maximum value of the quantity of DMRSs that can be contained in the $i^{th}$ group, that is, until allocation to the $i^{th}$ group is completed.

In a case in which the base station determines that the quantity of DMRSs allocated to the $i^{th}$ group does not yet reach the determined maximum value of the quantity of DMRSs that can be contained in the $i^{th}$ group, the base station calculates the distance between the channel of each of the unallocated DMRSs and the subspace formed by a channel of a DMRS already allocated to the $i^{th}$ group. The base station selects, according to a result obtained by means of calculation, the DMRS that is corresponding to the data stream and whose distance to the subspace formed by the channel of the DMRS already allocated to the $i^{th}$ group is longest, and allocates the selected DMRS corresponding to the data stream to the $i^{th}$ group. The base station adds a channel of the DMRS corresponding to the data stream to the subspace formed by the channel of the DMRS already allocated to the $i^{th}$ group. In this case, because another new DMRS corresponding to a data stream is allocated to the $i^{th}$ group, it is necessary to jump to a step of determining whether the quantity of DMRSs allocated to the $i^{th}$ group reaches the maximum quantity of DMRSs contained in the $i^{th}$ group, that is, step W7. In this way, if it is determined in step W7 that the quantity of DMRSs allocated to the $i^{th}$ group does not reach the maximum quantity of DMRSs contained in the $i^{th}$ group, step W8 is performed next, so as to form a cycle of allocating a DMRS to the $i^{th}$ group until the quantity of DMRSs allocated to the $i^{th}$ group reaches the maximum quantity of DMRSs contained in the $i^{th}$ group.

It should be noted that during grouping, the base station needs to maximize, as much as possible, a distance between channels of DMRSs in each group that are corresponding to data streams, so as to minimize interference between the DMRSs in the group that are corresponding to the data streams.

Further, the base station calculates the distance between each of the DMRSs that are corresponding to the data streams and are not allocated to the M groups and the DMRS channel subspace of the $i^{th}$ group according to a formula $h_k(I-P^H(PP^H)^{-1}P)h_{kH}$, where $h_k$ represents a channel matrix of each of the DMRSs that are corresponding to the data streams and are not allocated to the M groups, $h_{kH}$ represents a transposed matrix of the channel matrix of each of the DMRSs that are corresponding to the data streams and are not allocated to the M groups, P represents a matrix of the DMRS channel subspace of the $i^{th}$ group, $P^H$ represents a transposed matrix of the matrix of the DMRS channel subspace of the $i^{th}$ group, and I represents an identity matrix. Alternatively, the base station may calculate, according to a formula $|h_k(I-P^HP)|$, the distance between each of the DMRSs that are corresponding to the data streams and are not allocated to the M groups and the DMRS channel subspace of the $i^{th}$ group, where $h_k$ represents a channel matrix of each of the DMRSs that are corresponding to the data streams and are not allocated to the M groups, and in this case, P represents a matrix of the DMRS channel subspace of the $i^{th}$ group, $P^H$ represents a transposed matrix of the matrix of the DMRS channel subspace of the $i^{th}$ group, that is, $PP^H=I$, and I represents an identity matrix. A specific formula used for calculating the distance between each of the DMRSs that are corresponding to the data streams and are not allocated to the M groups and the DMRS channel subspace of the $i^{th}$ group is not limited in the present disclosure.

W9. If the quantity of DMRSs allocated to the $i^{th}$ group reaches the maximum quantity of DMRSs contained in the $i^{th}$ group, update the $i^{th}$ group to a DMRS-allocated group in the M groups, and continue to perform the determining whether all the DMRSs corresponding to the N data streams are allocated to the M groups, until it is determined that all the DMRSs corresponding to the N data streams are allocated to the M groups.

In a case in which the base station determines that the quantity of DMRSs allocated to the $i^{th}$ group reaches the determined maximum value of the quantity of DMRSs that can be contained in the $i^{th}$ group, it indicates that allocation to the $i^{th}$ group is already completed, and then the base station adds the $i^{th}$ group to a group for which allocation is already completed. By using the foregoing steps, all or some of the DMRSs that are corresponding to the data streams and are not allocated to the M groups may be allocated to the $i^{th}$ group. After DMRS allocation to the $i^{th}$ group is completed, it is necessary to detect whether there is a DMRS that is corresponding to a data stream and is not grouped. In this case, the step of determining whether all the DMRSs corresponding to the N data streams are allocated to the M groups needs to be performed until it is determined that all the DMRSs corresponding to the N data streams are allocated to the M groups. That is, after adding the $i^{th}$ group to the group for which allocation is already completed, that is, after completing DMRS allocation to one group, the base station jumps to step W2; and when determining that all the DMRSs corresponding to the N data streams are not allocated to the M groups, may continue to perform steps W3-W9, so as to form a cycle of determining the $i^{th}$ group and allocating, to the $i^{th}$ group, the DMRSs that are corresponding to the data streams and are not allocated to the M groups, until it is determined that all the DMRSs corresponding to the N data streams are allocated to the M groups.

Figure 5A:
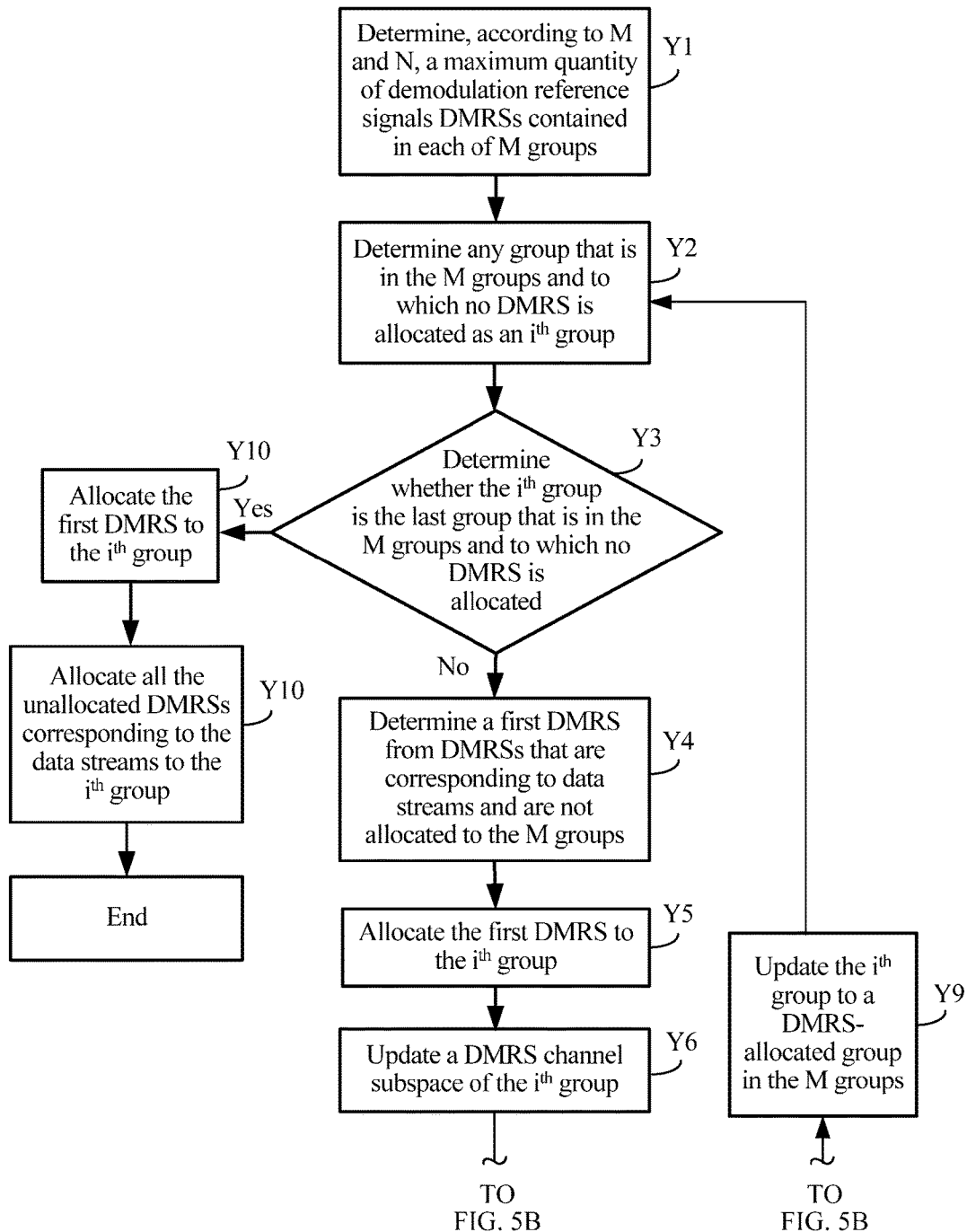
FIG. 5A and FIG. 5B are another schematic flowchart of grouping DMRSs corresponding to N data streams into M groups according to an embodiment of the present invention.
Figure 5B:
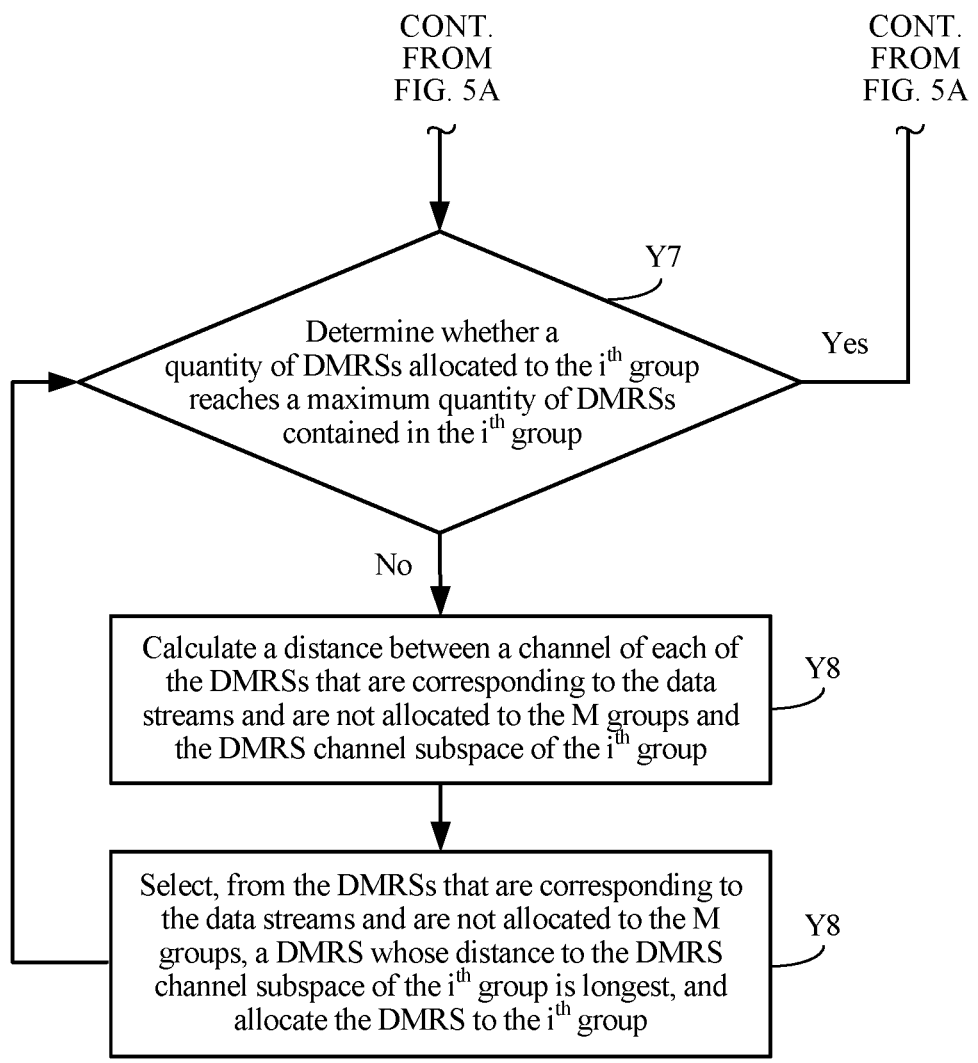

A second method is shown in FIG. 5A and FIG. 5B, and includes the following steps.

Y1. Determine, according to a value of a group quantity M and a quantity N of the data streams, a maximum quantity of DMRSs contained in each of the M groups.

Reference may be made to step W1 in the first method in the first case, and details are not described herein again.

Y2. Determine any group that is in the M groups and to which no DMRS is allocated as an $i^{th}$ group.

The base station randomly selects one group from groups to which no DMRS is allocated yet, and sets the group as the current $i^{th}$ group.

Y3. Determine whether the $i^{th}$ group is the last group that is in the M groups and to which no DMRS is allocated.

Because M is the value of the group quantity that is preset by the base station for grouping the DMRSs, the base station may determine, according to the value of M, whether the current $i^{th}$ group is the last group that is in the M groups and to which no DMRS is allocated.

It should be noted that the base station performs different steps according to different results of the determining. If it is determined that the $i^{th}$ group is not the last group that is in the M groups and to which no DMRS is allocated, steps Y4-Y9 are performed; or if it is determined that the $i^{th}$ group is the last group that is in the M groups and to which no DMRS is allocated, step Y10 is performed.

Y4. When it is determined that the $i^{th}$ group is not the last group that is in the M groups and to which no DMRS is allocated, determine a first DMRS from DMRSs that are corresponding to data streams and are not allocated to the M groups.

In a case in which the base station determines that the $i^{th}$ group is not the last group that is in the M groups and to which no DMRS is allocated, the base station needs to select, from the DMRSs that are corresponding to the data streams and are not yet grouped, a DMRS corresponding to one data stream as the first DMRS.

For a process in which the base station selects the first DMRS, refer to a process in which the base station selects the first DMRS in step W3 in the first method in the second case, and details are not described herein again.

Y5. Allocate the first DMRS to the $i^{th}$ group.

Reference may be made to step W5 in the first method in the second case, and details are not described herein again.

Y6. Update a DMRS channel subspace of the $i^{th}$ group according to a channel of the first DMRS.

Reference may be made to step W6 in the first method in the first case, and details are not described herein again.

Y7. Determine whether a quantity of DMRSs allocated to the $i^{th}$ group reaches a maximum quantity of DMRSs contained in the $i^{th}$ group.

In step Y1, the base station already determines a maximum value of the quantity of DMRSs that can be contained in the $i^{th}$ group. After one DMRS is allocated to the $i^{th}$ group, the base station may determine whether the quantity of DMRSs allocated to the $i^{th}$ group reaches the determined maximum value of the quantity of DMRSs that can be contained in the $i^{th}$ group.

It should be noted that the base station performs different steps according to different results of the determining. If the quantity of DMRSs allocated to the $i^{th}$ group does not reach the maximum quantity of DMRSs contained in the $i^{th}$ group, step Y8 is performed; or if the quantity of DMRSs allocated to the $i^{th}$ group reaches the maximum quantity of DMRSs contained in the $i^{th}$ group, step Y9 is performed.

Y8. If the quantity of DMRSs allocated to the $i^{th}$ group does not reach the maximum quantity of DMRSs contained in the $i^{th}$ group, calculate a distance between a channel of each of the DMRSs that are corresponding to the data streams and are not allocated to the M groups and the DMRS channel subspace of the $i^{th}$ group; select, according to the distance between the channel of each of the DMRSs that are corresponding to the data streams and are not allocated to the M groups and the DMRS channel subspace of the $i^{th}$ group and from the DMRSs that are corresponding to the data streams and are not allocated to the M groups, a DMRS whose distance to the DMRS channel subspace of the $i^{th}$ group is longest, and allocate the DMRS to the $i^{th}$ group; and continue to perform the determining whether a quantity of DMRSs allocated to the $i^{th}$ group reaches a maximum quantity of DMRSs contained in the $i^{th}$ group, until the quantity of DMRSs allocated to the $i^{th}$ group reaches the maximum quantity of DMRSs contained in the $i^{th}$ group.

Reference may be made to step W8 in the first method in the second case, and details are not described herein again.

Y9. If the quantity of DMRSs allocated to the $i^{th}$ group reaches the maximum quantity of DMRSs contained in the $i^{th}$ group, update the $i^{th}$ group to a DMRS-allocated group in the M groups, and continue to perform the determining any group that is in the M groups and to which no DMRS is allocated as an $i^{th}$ group.

In a case in which the base station determines that the quantity of DMRSs allocated to the $i^{th}$ group reaches the determined maximum value of the quantity of DMRSs that can be contained in the $i^{th}$ group, it indicates that allocation to the $i^{th}$ group is already completed, and then the base station adds the $i^{th}$ group to a group for which allocation is already completed. By using the foregoing steps, all or some of the DMRSs that are corresponding to the data streams and are not allocated to the M groups may be allocated to the $i^{th}$ group. After DMRS allocation to the $i^{th}$ group is completed, the step of determining any group that is in the M groups and to which no DMRS is allocated as an $i^{th}$ group needs to be performed until it is determined that DMRSs corresponding to data streams are allocated to all M−1 groups. That is, after DMRS allocation to one group is completed, the base station jumps to step Y2. After performing Y3, the base station determines that the $i^{th}$ group is not the last group that is in the M groups and to which no DMRS is allocated. The base station may continue to perform steps Y4-Y9, so as to form a cycle of determining the $i^{th}$ group and allocating, to the $i^{th}$ group, the DMRSs that are corresponding to the data streams and are not allocated to the M groups, until it is determined that the DMRSs corresponding to the data streams are allocated to all the M−1 groups.

Y10. When it is determined that the $i^{th}$ group is the last group that is in the M groups and to which no DMRS is allocated, allocate all the unallocated DMRSs corresponding to the N data streams to the $i^{th}$ group.

When the base station determines that the $i^{th}$ group is the last group to which a DMRS corresponding to a data stream needs to be allocated, it indicates that all the ultimately unallocated DMRSs corresponding to the data streams need to be allocated to the $i^{th}$ group. In this case, the base station does not need to perform steps of determining the first DMRS and sequentially selecting a DMRS corresponding to one data stream to add the DMRS to the $i^{th}$ group, but directly allocates all the unallocated DMRSs corresponding to the data streams to the $i^{th}$ group.

It should be noted that after this step is performed, allocation of DMRSs, corresponding to data streams, to each of the M groups is already completed, which indicates that allocation of all the DMRSs is already completed; therefore, grouping ends.

Alternatively, in a third case in which the first information includes the angle-of-arrival information of the terminal device, the grouping the DMRSs corresponding to the N data streams into the M groups according to the first information of each data stream includes the following steps:

Q1. Sort, according to the angle-of-arrival information of the terminal device, the DMRSs corresponding to the N data streams in order of the angle of the angle-of-arrival of the terminal device.

The base station determines an angle of arrival of the terminal device according to the user ID carried in the data stream, and then may sort, according to acquired angles of arrival that are of the terminal device and are corresponding to all the data streams, the DMRSs corresponding to the N data streams in ascending order or descending order of the acquired angles of arrival of the terminal device.

Q2. Group the DMRSs that are corresponding to the N data streams and are sorted in order of the angles of arrival of the terminal device into L groups by using DMRSs corresponding to every M data streams as one group, where L=[N/M].

It should be noted that M is a value of a group quantity that is preset by the base station for grouping the DMRSs.

It should be noted that L=[N/M] represents that a value of L is obtained by rounding up a quotient after the quantity of DMRSs corresponding to the data streams is divided by the preset quantity of groups to which DMRSs need to be allocated.

It should be noted that when allocation proceeds to the $L^{th}$ group in the L groups by using the DMRSs corresponding to every M data streams as one group, if a quantity of remaining unallocated DMRSs corresponding to data streams is less than M, the remaining unallocated DMRSs corresponding to the data streams are allocated to the $L^{th}$ group. In this case, previous L−1 groups each have DMRSs corresponding to M data streams, and the $L^{th}$ group has DMRSs corresponding to N−M*(L−1) data streams.

Q3. Cyclically select a first DMRS from each of the L groups according to the angles of arrival of the terminal device, and group the selected first DMRSs into one group until the DMRSs corresponding to the N data streams are grouped into the M groups.

Further, the first DMRS refers to a DMRS that is corresponding to a data stream having a minimum or a maximum angle of arrival of the terminal device.

The base station selects, from each of the L groups obtained by means of grouping, a DMRS that is corresponding to a data stream having a minimum or a maximum angle of arrival of the terminal device as the first DMRS, and in this case, the base station selects DMRSs corresponding to a maximum of L data streams in total. The base station groups the selected DMRSs corresponding to the data streams into one group, which is one of the M DMRS groups finally determined by the base station. After determining one group, the base station continues to select, from each of the L groups obtained by means of grouping, a DMRS that is corresponding to a data stream having a minimum or a maximum angle of arrival of the terminal device as the first DMRS, and groups selected DMRSs into one group until the DMRSs corresponding to the N data streams are grouped into the M groups.

It should be noted that during grouping, the base station needs to maximize, as much as possible, a difference between angles of arrival that are of the terminal device and are corresponding to DMRSs in each group that are corresponding to data streams, so as to minimize interference between the DMRSs in the group that are corresponding to the data streams.

It is assumed that there are DMRSs corresponding to five data streams, and in this case, N is 5. The DMRSs corresponding to all the data streams are sorted as a DMRS1, a DMRS2, a DMRS3, a DMRS4, and a DMRS5 in ascending order of corresponding angles of arrival of the terminal device. It is assumed that the DMRSs corresponding to all the data streams need to be finally grouped into two groups, and in this case, M is 2. L=[N/M]=[5/2]=3, that is, L is 2.5 rounded up to 3. That is, when the DMRSs corresponding to the five data streams are to be grouped into two groups, the sorted DMRSs that are corresponding to the data streams are grouped into three groups by using DMRSs corresponding to every three data streams as one group. The DMRS1 and the DMRS2 are in the first group, the DMRS2 and the DMRS3 are in the second group, and the DMRS5 is in the third group. Then, the base station determines the DMRS1 in the first group, the DMRS3 in the second group, and the DMRS5 in the third group as first DMRSs, and determines the DMRS1, the DMRS3, and the DMRS5 as one group in the two groups into which the DMRSs need to be grouped. After determining one group, the base station determines that grouping of all the DMRSs is not completed; continues to perform steps of selecting and determining; and determines the DMRS2 and the DMRS4 as current first DMRSs. The base station also determines the DMRS2 and the DMRS4 as the other group in the two groups into which the DMRSs need to be grouped. The base station determines that the DMRSs corresponding to all the five data streams are fully grouped. Now, grouping ends.

104. Map each group, in the M groups, of DMRSs corresponding to data streams to corresponding resource element (RE) positions, and acquire port-related information corresponding to each group of DMRSs.

It should be noted that the Resource Element (RE) is a type of time-frequency resource, and one RE represents a sampling point corresponding to a frequency at a moment in a data block. For the base station, the base station may send data to the terminal device on each frequency at each moment.

It should be noted that the port-related information corresponding to each group of DMRSs may be information about ports for sending the data streams to the terminal device, or information and other configuration information about ports for sending the data streams to the terminal device.

It should be noted that the ports for sending the data streams are in a one-to-one correspondence with sequence information of the RE positions corresponding to each group of DMRSs. That is, if the corresponding ports for sending the data streams are learned, an RE position sequence corresponding to the DMRSs corresponding to the data streams can be learned according to a correspondence rule preset by a system, so as to obtain DMRS information corresponding to the data streams.

It should be noted that the RE position sequence is a sequence that identifies the RE positions corresponding to each group of DMRSs.

105. Send the port-related information corresponding to each group of DMRSs to a terminal device.

After mapping the grouped DMRSs to the RE positions, the base station needs to send the sequence information of the RE positions to the terminal device, so that the terminal device can learn positions of each group of DMRSs corresponding to the data streams.

Further, the base station may send the port-related information corresponding to each group of DMRSs to the terminal device by using a Physical Downlink Control Channel (PDCCH).

106. Add each group of DMRSs in the M groups to data streams, and send the data streams to which the DMRSs are added to the terminal device.

The base station adds each group of DMRSs in the M groups to the data streams by using a non-orthogonal time division multiplexing, frequency division multiplexing, or code division multiplexing DMRS scheme.

Further, frequency division multiplexing is used between DMRS groups in a same timeslot, time division multiplexing is used between DMRS groups in different timeslots, and code division multiplexing is used between DMRSs within each group.

It should be noted that in this case, the DMRSs in each group are not fully orthogonal.

According to the data processing method provided in this embodiment of the present invention, after receiving data streams sent by a network-side device, a base station needs to obtain DMRS information corresponding to each data stream; then groups DMRSs corresponding to the data streams according to a particular method, and maps the grouped DMRSs to corresponding RE positions; and finally sends corresponding port-related information and the data streams to which the DMRSs are added to a terminal device. In this way, when a quantity of data streams is greater than a quantity of DMRS ports of the base station, the base station may group, according to a particular method, DMRSs corresponding to the data streams, and send DMRSs that are corresponding to data streams and are in different groups to a terminal by using the data streams, thereby reducing interference between the DMRSs and improving accuracy in channel estimation performed by a user without increasing time-frequency resources occupied by the DMRSs.

Figure 6:
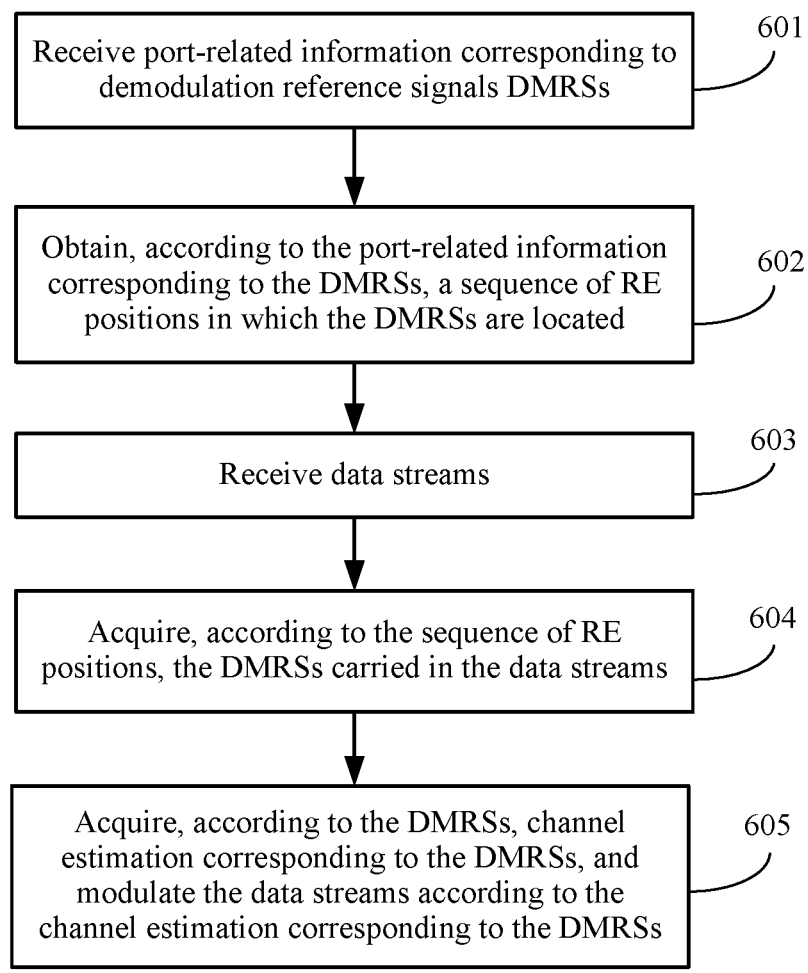
FIG. 6 is a schematic flowchart of another data processing method according to an embodiment of the present invention.

An embodiment of the present invention provides a data processing method, and as shown in FIG. 6, the method includes the following steps.

601. Receive port-related information corresponding to DMRSs.

The port-related information corresponding to the DMRSs is used for obtaining a sequence of RE positions in which the DMRSs are located, and the sequence of RE positions in which the DMRSs are located is used for identifying the RE positions in which the DMRSs are located.

It should be noted that port-related information corresponding to each group of DMRSs corresponding to data streams is related information about ports for sending the data streams to a terminal device.

It should be noted that the ports for sending the data streams are in a one-to-one correspondence with sequence information of the RE positions corresponding to each group of DMRSs. That is, if the corresponding ports for sending the data streams are learned, an RE position sequence corresponding to the DMRSs corresponding to the data streams can be learned according to a correspondence rule preset by a system, so as to obtain DMRS information corresponding to the data streams.

Further, the terminal device receives the sequence information of RE positions by using a downlink control channel PDCCH.

602. Obtain, according to the port-related information corresponding to the DMRSs, a sequence of RE positions in which the DMRSs are located.

After receiving the port-related information corresponding to the DMRSs, the terminal device obtains the sequence of RE positions according to the rule, preset by the system, of a one-to-one correspondence between the sending ports and the RE position sequence of RE positions.

603. Receive data streams.

Each of the data streams carries a DMRS.

Because the base station adds the DMRSs to the data streams for sending, the data streams received by the terminal device are data streams that contain the DMRSs corresponding to the data streams.

604. Acquire, according to the sequence of RE positions, the DMRSs carried in the data streams.

The terminal device may obtain, by means of parsing according to the sequence of RE positions corresponding to the DMRSs, the DMRSs carried in the data streams.

605. Acquire, according to the DMRSs, channel estimation corresponding to the DMRSs, and modulate the data streams according to the channel estimation corresponding to the DMRSs.

According to the data processing method provided in this embodiment of the present invention, after receiving a sequence of RE positions and data streams that are sent by a base station, a terminal device acquires, according to the sequence of RE positions, DMRSs carried in the data streams, and then acquires, according to the DMRSs, channel estimation corresponding to the DMRSs, so as to modulate the data streams. In this way, when a quantity of data streams is greater than a quantity of DMRS ports of the base station, interference between the DMRSs is reduced and accuracy in channel estimation performed by a user is improved without increasing time-frequency resources occupied by the DMRSs.

Figure 7:
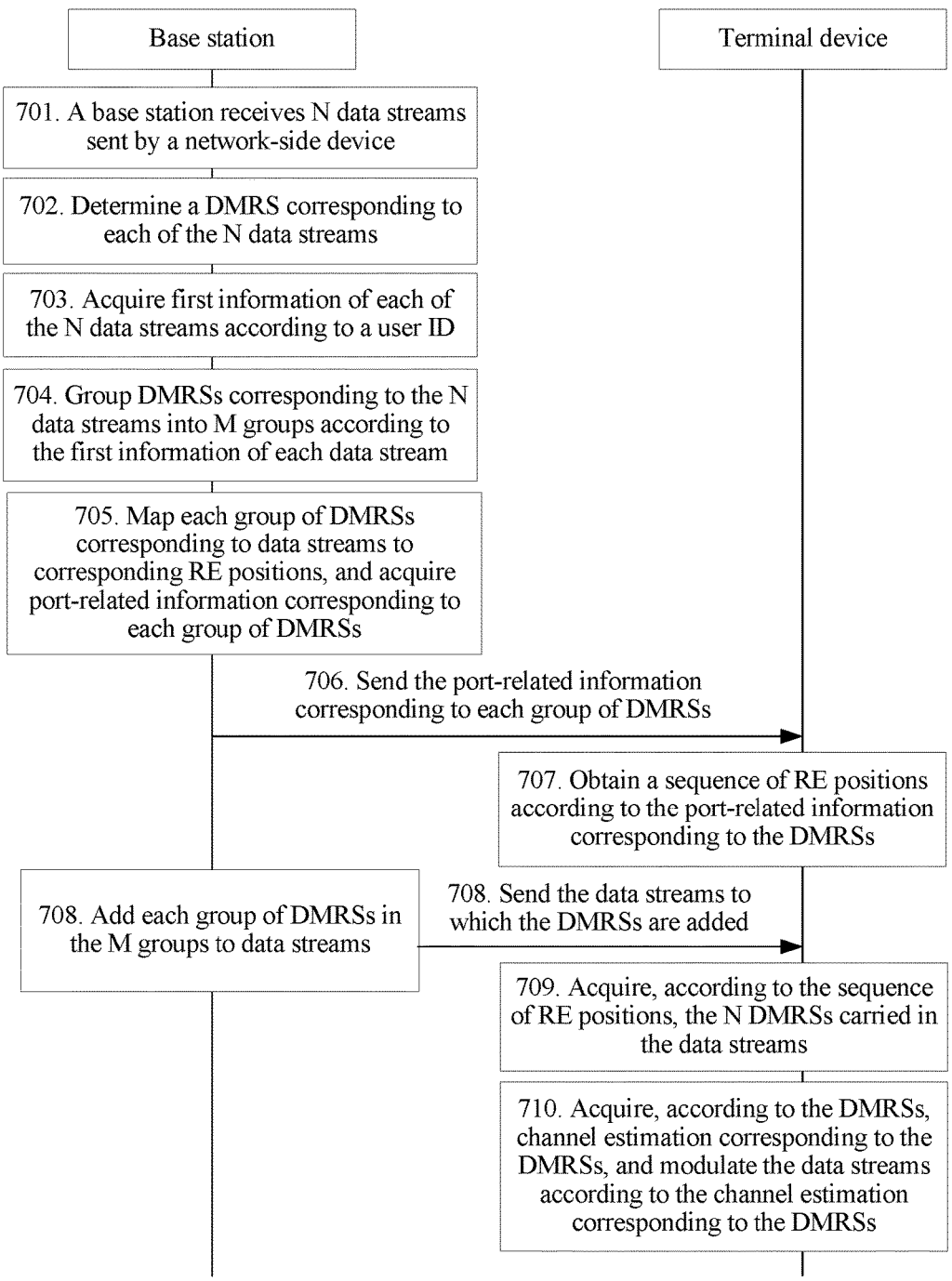
FIG. 7 is a schematic flowchart of another data processing method according to an embodiment of the present invention.

An embodiment of the present invention provides a data processing method, and as shown in FIG. 7, the method includes the following steps.

701. A base station receives N data streams.

The data stream carries a user identity ID, and N is an integer greater than a quantity of DMRS ports of the base station.

Reference may be made to step 101, and details are not described herein again.

702. Determine a DMRS corresponding to each of the N data streams.

Reference may be made to step 102, and details are not described herein again.

703. The base station acquires first information of each of the N data streams according to a user ID.

The first information is related information used for grouping the DMRSs corresponding to the data streams.

Further, the first information includes channel estimation and/or angle-of-arrival information of a terminal device.

A manner in which the base station acquires the first information according to the user ID varies with classification of systems. In a Time Division Duplexing (TDD) system, the base station may acquire channel estimation according to an uplink sounding reference signal transmitted between the base station and the terminal device. In an Frequency Division Duplexing (FDD) system, the base station may obtain channel estimation by using a user feedback from the terminal device.

It should be noted that the angle-of-arrival information of the terminal device can be obtained by using various algorithms, and available algorithms include multiple signal classification (MUSIC) and Estimation of signal parameters via rotational invariance technique (Espirt).

It should be noted that the first information may further be other information about the terminal device. For example, in a Line Of Sight (LOS) path dominant scenario, the first information may be geographical position information performed by a user, which is not limited in the present disclosure.

704. The base station groups DMRSs corresponding to the N data streams into M groups according to the first information of each data stream.

Reference may be made to step 103, and details are not described herein again.

705. The base station maps each group, in the M groups, of DMRSs corresponding to data streams to corresponding RE positions, and acquires port-related information corresponding to each group of DMRSs.

The port-related information corresponding to each group of DMRSs is in a one-to-one correspondence with a sequence of the RE positions.

Reference may be made to step 104, and details are not described herein again.

706. The base station sends the port-related information corresponding to each group of DMRSs to a terminal device, and the terminal device receives port-related information corresponding to DMRSs.

Reference may be made to step 105 and step 601, and details are not described herein again.

707. The terminal device obtains, according to the port-related information corresponding to the DMRSs, a sequence of RE positions in which the DMRSs are located.

Reference may be made to step 602, and details are not described herein again.

708. The base station adds each group of DMRSs in the M groups to data streams, and sends the data streams to which the DMRSs are added to the terminal device, and the terminal device receives data streams.

Reference may be made to step 106 and step 603, and details are not described herein again.

709. The terminal device acquires, according to the sequence of RE positions, the DMRSs carried in the data streams.

Reference may be made to step 604, and details are not described herein again.

710. The terminal device acquires, according to the DMRSs, channel estimation corresponding to the DMRSs, and demodulates the data streams according to the channel estimation corresponding to the DMRSs.

According to the data processing method provided in this embodiment of the present invention, after receiving data streams sent by a network-side device, a base station needs to obtain DMRS information corresponding to each data stream; then groups DMRSs corresponding to the data streams according to a particular method, and maps the grouped DMRSs to corresponding RE positions; and finally sends port-related information corresponding to each group of DMRSs and the data streams to which the DMRSs are added to a terminal device. After receiving a sequence of RE positions and the data streams that are sent by the base station, the terminal device acquires, according to the sequence of RE positions, the DMRSs carried in the data streams, and then performs demodulation on the data streams according to the DMRSs. In this way, when a quantity of data streams is greater than a quantity of DMRS ports of the base station, the base station may group DMRSs according to a particular method, and send DMRSs in different groups to a terminal by using the data streams, thereby reducing interference between the DMRSs and improving accuracy in channel estimation performed by a user without increasing time-frequency resources occupied by the DMRSs.

Figure 8:
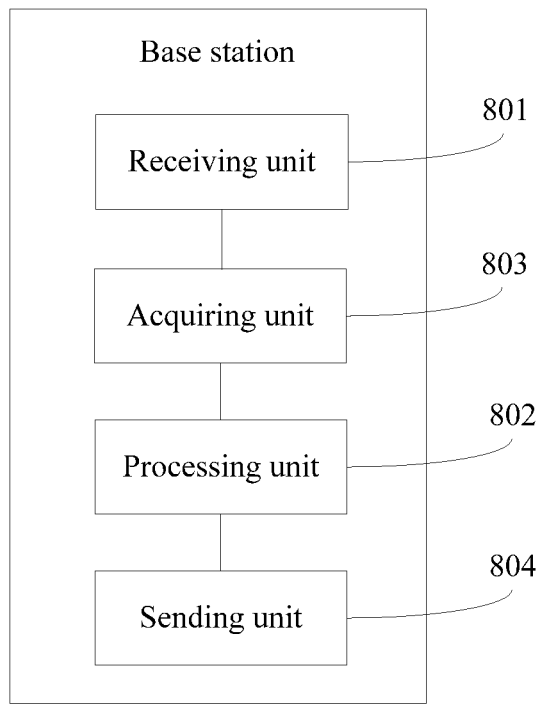
FIG. 8 is a schematic functional diagram of a base station according to an embodiment of the present invention.

FIG. 8 is a schematic functional diagram of a base station according to an embodiment of the present invention. Referring to FIG. 8, the base station includes: a receiving unit 801, a processing unit 802, an acquiring unit 803, and a sending unit 804.

The receiving unit 801 is configured to receive N data streams sent by a network-side device.

The data stream carries a user identity ID, and N is an integer greater than a quantity of DMRS ports of the base station.

Specifically, when a network side needs to send the data streams to a terminal device, the network side may send the data streams to the base station that serves the terminal device, and the base station sends the data streams to the terminal device. In this case, the receiving unit of the base station receives the data streams that are transmitted from the network side and need to be transmitted by the base station to the terminal device served by the base station.

It should be noted that N is an integer greater than the quantity of DMRS ports of the base station, that is, at least one DMRS port of the base station needs to be used to send multiple data streams.

The processing unit 802 is configured to generate a demodulation reference signal DMRS corresponding to each of the N data streams.

After receiving the N data streams, the processing unit 802 obtains, according to a preset DMRS generation rule, the DMRS corresponding to each of the N data streams.

The processing unit 802 is further configured to group DMRSs corresponding to the N data streams into M groups.

It should be noted that M is a value of a group quantity that is preset by the base station for grouping the DMRSs.

Further, the acquiring unit 803 is further configured to acquire first information of each of the N data streams according to the user ID.

The first information is related information used for grouping the DMRSs.

Further, the first information includes channel estimation and/or angle-of-arrival information of the terminal device.

Accordingly, the processing unit 802 is configured to group the DMRSs corresponding to the N data streams into the M groups according to the first information that is of each data stream and is acquired by the acquiring unit.

Further, a grouping rule in which the processing unit 802 groups the DMRSs corresponding to the N data streams into M groups varies with a specific case of the first information.

Specifically, in a first case in which the first information includes the channel estimation, the grouping rule may be a grouping rule based on channel relevance. In this case, the processing unit 802 uses two methods, which are specifically as follows.

In a first method, the processing unit 802 is configured to determine, according to a value of a group quantity M and a quantity N of the data streams, a maximum quantity of DMRSs contained in each of the M groups.

The processing unit 802 is configured to determine whether all the DMRSs corresponding to the N data streams are allocated to the M groups.

The processing unit 802 is configured to: in a case in which it is determined that all the DMRSs corresponding to the N data streams are not allocated to the M groups, determine a first DMRS from DMRSs that are corresponding to data streams and are not allocated to the M groups.

Further, the processing unit 802 is configured to determine, from the DMRSs that are corresponding to the data streams and are not allocated to the M groups, a DMRS whose channel strength is lowest as the first DMRS.

The processing unit 802 is configured to determine any group that is in the M groups and to which no DMRS is allocated as an $i^{th}$ group.

The processing unit 802 is configured to allocate the first DMRS to the $i^{th}$ group.

The processing unit 802 is configured to update a DMRS channel subspace of the $i^{th}$ group according to a channel of the first DMRS.

The processing unit 802 is configured to determine whether a quantity of DMRSs allocated to the $i^{th}$ group reaches a maximum quantity of DMRSs contained in the $i^{th}$ group.

The processing unit 802 is configured to: in a case in which the quantity of DMRSs allocated to the $i^{th}$ group does not reach the maximum quantity of DMRSs contained in the $i^{th}$ group, calculate relevance between a channel of each of the DMRSs that are corresponding to the data streams and are not allocated to the M groups and the DMRS channel subspace of the $i^{th}$ group. The processing unit 802 is also configured to select, according to the relevance between the channel of each of the DMRSs that are corresponding to the data streams and are not allocated to the M groups and the DMRS channel subspace of the $i^{th}$ group and from the DMRSs that are corresponding to the data streams and are not allocated to the M groups, a DMRS that has least relevance to the DMRS channel subspace of the $i^{th}$ group, and allocate the DMRS to the $i^{th}$ group. The processing unit 802 is also configured to continue to perform the determining whether a quantity of DMRSs allocated to the $i^{th}$ group reaches a maximum quantity of DMRSs contained in the $i^{th}$ group, until the quantity of DMRSs allocated to the $i^{th}$ group reaches the maximum quantity of DMRSs contained in the $i^{th}$ group.

Further, the processing unit 802 is configured to calculate the relevance between the channel of each of the DMRSs that are corresponding to the data streams and are not allocated to the M groups and the DMRS channel subspace of the $i^{th}$ group according to a formula $h_k P^H (PP^H)^{-1} Ph_{kH}/|h_k|^2$, where $h_k$ represents a channel matrix of each of the DMRSs that are corresponding to the data streams and are not allocated to the M groups, $h_{kH}$ represents a transposed matrix of the channel matrix of each of the DMRSs that are corresponding to the data streams and are not allocated to the M groups, P represents a matrix of the DMRS channel subspace of the $i^{th}$ group, and $P^H$ represents a transposed matrix of the matrix of the DMRS channel subspace of the $i^{th}$ group.

The processing unit 802 is specifically configured to: in a case in which the quantity of DMRSs allocated to the $i^{th}$ group reaches the maximum quantity of DMRSs contained in the $i^{th}$ group, update the $i^{th}$ group to a DMRS-allocated group in the M groups, and continue to perform the determining whether all the DMRSs corresponding to the N data streams are allocated to the M groups, until it is determined that all the DMRSs corresponding to the N data streams are allocated to the M groups.

In a second method, the processing unit 802 is configured to determine, according to a value of a group quantity M and a quantity N of the data streams, a maximum quantity of DMRSs contained in each of the M groups.

The processing unit 802 is configured to determine any group that is in the M groups and to which no DMRS is allocated as an $i^{th}$ group.

The processing unit 802 is configured to determine whether the $i^{th}$ group is the last group that is in the M groups and to which no DMRS is allocated.

The processing unit 802 is configured to: when it is determined that the $i^{th}$ group is not the last group that is in the M groups and to which no DMRS is allocated, determine a first DMRS from DMRSs that are corresponding to data streams and are not allocated to the M groups.

Further, the processing unit 802 is configured to determine, from the DMRSs that are corresponding to the data streams and are not allocated to the M groups, a DMRS whose channel strength is lowest as the first DMRS.

The processing unit 802 is configured to allocate the first DMRS to the $i^{th}$ group.

The processing unit 802 is configured to update a DMRS channel subspace of the $i^{th}$ group according to a channel of the first DMRS.

The processing unit 802 is configured to determine whether a quantity of DMRSs allocated to the $i^{th}$ group reaches a maximum quantity of DMRSs contained in the $i^{th}$ group.

The processing unit 802 is configured to: in a case in which the quantity of DMRSs allocated to the $i^{th}$ group does not reach the maximum quantity of DMRSs contained in the $i^{th}$ group, calculate relevance between a channel of each of the DMRSs that are corresponding to the data streams and are not allocated to the M groups and the DMRS channel subspace of the $i^{th}$ group. The processing unit 802 is also configured to select, according to the relevance between the channel of each of the DMRSs that are corresponding to the data streams and are not allocated to the M groups and the DMRS channel subspace of the $i^{th}$ group and from the DMRSs that are corresponding to the data streams and are not allocated to the M groups, a DMRS that has least relevance to the DMRS channel subspace of the $i^{th}$ group, and allocate the DMRS to the $i^{th}$ group. The processing unit 802 is also configured to continue to perform the determining whether a quantity of DMRSs allocated to the $i^{th}$ group reaches a maximum quantity of DMRSs contained in the $i^{th}$ group, until the quantity of DMRSs allocated to the $i^{th}$ group reaches the maximum quantity of DMRSs contained in the $i^{th}$ group.

Further, the processing unit 802 is configured to calculate the relevance between the channel of each of the DMRSs that are corresponding to the data streams and are not allocated to the M groups and the DMRS channel subspace of the $i^{th}$ group according to a formula $h_k P^H (PP^H)^{-1} P h_{kH} / |h_k|^2$, where $h_k$ represents a channel matrix of each of the DMRSs that are corresponding to the data streams and are not allocated to the M groups, $h_{kH}$ represents a transposed matrix of the channel matrix of each of the DMRSs that are corresponding to the data streams and are not allocated to the M groups, P represents a matrix of the DMRS channel subspace of the $i^{th}$ group, and $P^H$ represents a transposed matrix of the matrix of the DMRS channel subspace of the $i^{th}$ group.

The processing unit 802 is configured to: in a case in which the quantity of DMRSs allocated to the $i^{th}$ group reaches the maximum quantity of DMRSs contained in the $i^{th}$ group, update the $i^{th}$ group to a DMRS-allocated group in the M groups, and continue to perform the determining any group that is in the M groups and to which no DMRS is allocated as an $i^{th}$ group.

Further, in the first case, the acquiring unit 803 is further configured to acquire, according to channel estimation of each data stream, channel strength of the DMRS corresponding to each data stream.

Alternatively, in a second case in which the first information includes the channel estimation, the grouping rule may be a grouping rule based on a channel distance. In this case, the processing unit 802 uses two methods, which are specifically as follows.

In a first method, the processing unit 802 is configured to determine, according to a value of a group quantity M and a quantity N of the data streams, a maximum quantity of DMRSs contained in each of the M groups.

The processing unit 802 is configured to determine whether all the DMRSs corresponding to the N data streams are allocated to the M groups.

The processing unit 802 is configured to: in a case in which it is determined that all the DMRSs corresponding to the N data streams are not allocated to the M groups, determine a first DMRS from DMRSs that are corresponding to data streams and are not allocated to the M groups.

Further, the processing unit 802 is configured to determine, from the DMRSs that are corresponding to the data streams and are not allocated to the M groups, a DMRS whose channel strength is highest as the first DMRS.

The processing unit 802 is configured to determine any group that is in the M groups and to which no DMRS is allocated as an $i^{th}$ group.

The processing unit 802 is configured to allocate the first DMRS to the $i^{th}$ group.

The processing unit 802 is configured to update a DMRS channel subspace of the $i^{th}$ group according to a channel of the first DMRS.

The processing unit 802 is configured to determine whether a quantity of DMRSs allocated to the $i^{th}$ group reaches a maximum quantity of DMRSs contained in the $i^{th}$ group.

The processing unit 802 is configured to: in a case in which the quantity of DMRSs allocated to the $i^{th}$ group does not reach the maximum quantity of DMRSs contained in the $i^{th}$ group, calculate a distance between a channel of each of the DMRSs that are corresponding to the data streams and are not allocated to the M groups and the DMRS channel subspace of the $i^{th}$ group. The processing unit 802 is also configured to select, according to the distance between the channel of each of the DMRSs that are corresponding to the data streams and are not allocated to the M groups and the DMRS channel subspace of the $i^{th}$ group and from the DMRSs that are corresponding to the data streams and are not allocated to the M groups, a DMRS whose distance to the DMRS channel subspace of the $i^{th}$ group is longest, and allocate the DMRS to the $i^{th}$ group. The processing unit 802 is also configured to continue to perform the determining whether a quantity of DMRSs allocated to the $i^{th}$ group reaches a maximum quantity of DMRSs contained in the $i^{th}$ group, until the quantity of DMRSs allocated to the $i^{th}$ group reaches the maximum quantity of DMRSs contained in the $i^{th}$ group.

Further, the processing unit 802 is configured to calculate the distance between the channel of each of the DMRSs that are corresponding to the data streams and are not allocated to the M groups and the DMRS channel subspace of the $i^{th}$ group according to a formula $h_k (I - P^H (PP^H)^{-1} P) h_{kH}$, where $h_k$ represents a channel matrix of each of the DMRSs that are corresponding to the data streams and are not allocated to the M groups, $h_{kH}$ represents a transposed matrix of the channel matrix of each of the DMRSs that are corresponding to the data streams and are not allocated to the M groups, P represents a matrix of the DMRS channel subspace of the $i^{th}$ group, $P^H$ represents a transposed matrix of the matrix of the DMRS channel subspace of the $i^{th}$ group, and I represents an identity matrix.

The processing unit 802 is configured to: in a case in which the quantity of DMRSs allocated to the $i^{th}$ group reaches the maximum quantity of DMRSs contained in the $i^{th}$ group, update the $i^{th}$ group to a DMRS-allocated group in the M groups, and continue to perform the determining whether all the DMRSs corresponding to the N data streams are allocated to the M groups, until it is determined that all the DMRSs corresponding to the N data streams are allocated to the M groups.

In a second method, the processing unit 802 is configured to determine, according to a value of a group quantity M and a quantity N of the data streams, a maximum quantity of DMRSs contained in each of the M groups.

The processing unit 802 is configured to determine any group that is in the M groups and to which no DMRS is allocated as an $i^{th}$ group.

The processing unit 802 is configured to determine whether the $i^{th}$ group is the last group that is in the M groups and to which no DMRS is allocated.

The processing unit 802 is configured to: when it is determined that the $i^{th}$ group is not the last group that is in the M groups and to which no DMRS is allocated, determine a first DMRS from DMRSs that are corresponding to data streams and are not allocated to the M groups.

Further, the processing unit 802 is configured to determine, from the DMRSs that are corresponding to the data streams and are not allocated to the M groups, a DMRS whose channel strength is highest as the first DMRS.

The processing unit 802 is configured to allocate the first DMRS to the $i^{th}$ group.

The processing unit 802 is configured to update a DMRS channel subspace of the $i^{th}$ group according to a channel of the first DMRS.

The processing unit 802 is configured to determine whether a quantity of DMRSs allocated to the $i^{th}$ group reaches a maximum quantity of DMRSs contained in the $i^{th}$ group.

The processing unit 802 is configured to: in a case in which the quantity of DMRSs allocated to the $i^{th}$ group does not reach the maximum quantity of DMRSs contained in the $i^{th}$ group, calculate a distance between a channel of each of the DMRSs that are corresponding to the data streams and are not allocated to the M groups and the DMRS channel subspace of the $i^{th}$ group. The processing unit 802 is configured to select, according to the distance between the channel of each of the DMRSs that are corresponding to the data streams and are not allocated to the M groups and the DMRS channel subspace of the $i^{th}$ group and from the DMRSs that are corresponding to the data streams and are not allocated to the M groups, a DMRS whose distance to the DMRS channel subspace of the $i^{th}$ group is longest, and allocate the DMRS to the $i^{th}$ group. The processing unit 802 is also configured to continue to perform the determining whether a quantity of DMRSs allocated to the $i^{th}$ group reaches a maximum quantity of DMRSs contained in the $i^{th}$ group, until the quantity of DMRSs allocated to the $i^{th}$ group reaches the maximum quantity of DMRSs contained in the $i^{th}$ group.

Further, the processing unit 802 is configured to calculate the distance between the channel of each of the DMRSs that are corresponding to the data streams and are not allocated to the M groups and the DMRS channel subspace of the $i^{th}$ group according to a formula $h_k(I-P^H(PP^H)^{-1}P)h_{kH}$, where $h_k$ represents a channel matrix of each of the DMRSs that are corresponding to the data streams and are not allocated to the M groups, $h_{kH}$ represents a transposed matrix of the channel matrix of each of the DMRSs that are corresponding to the data streams and are not allocated to the M groups, P represents a matrix of the DMRS channel subspace of the $i^{th}$ group, $P^H$ represents a transposed matrix of the matrix of the DMRS channel subspace of the $i^{th}$ group, and I represents an identity matrix.

The processing unit 802 is configured to: in a case in which the quantity of DMRSs allocated to the $i^{th}$ group reaches the maximum quantity of DMRSs contained in the $i^{th}$ group, update the $i^{th}$ group to a DMRS-allocated group in the M groups, and continue to perform the determining any group that is in the M groups and to which no DMRS is allocated as an $i^{th}$ group.

The processing unit 802 is further configured to: when it is determined that the $i^{th}$ group is the last group that is in the M groups and to which no DMRS is allocated, allocate all the unallocated DMRSs corresponding to the N data streams to the $i^{th}$ group.

Further, in the second case, the acquiring unit 803 is further configured to acquire, according to channel estimation of each data stream, channel strength of the DMRS corresponding to each data stream.

Alternatively, in a third case, the first information includes the angle-of-arrival information of the terminal device.

In this case, the processing unit 802 is configured to sort, according to the angle-of-arrival information of the terminal device, the DMRSs corresponding to the N data streams in order of angles of arrival of the terminal device.

The processing unit 802 is configured to group the DMRSs that are corresponding to the N data streams and are sorted in order of the angles of arrival of the terminal device into L groups by using DMRSs corresponding to every M data streams as one group, where L=[N/M].

The processing unit 802 is configured to cyclically select a first DMRS from each of the L groups according to the angles of arrival of the terminal device, and group the selected first DMRSs into one group until the DMRSs corresponding to the N data streams are grouped into the M groups.

The first DMRS refers to a DMRS corresponding to a minimum or a maximum angle of arrival of the terminal device.

The processing unit 802 is further configured to map each group of DMRSs in the M groups to corresponding resource element (RE) positions.

The acquiring unit 803 is further configured to acquire port-related information corresponding to each group of DMRSs.

The port-related information corresponding to each group of DMRSs is in a one-to-one correspondence with a sequence of the RE positions.

The sending unit 804 is configured to send the port-related information corresponding to each group of DMRSs to the terminal device.

The sending unit 804 is further configured to add each group of DMRSs in the M groups to data streams, and send the data streams to which the DMRSs are added to the terminal device.

The processing unit 802 is further configured to: when it is determined that the $i^{th}$ group is the last group that is in the M groups and to which no DMRS is allocated, allocate all the unallocated DMRSs corresponding to the N data streams to the $i^{th}$ group.

The sending unit 804 is configured to send the port-related information corresponding to each group of DMRSs to the terminal device by using a physical downlink control channel PDCCH.

According to the base station provided in this embodiment of the present invention, after receiving data streams sent by a network-side device, the base station needs to obtain DMRS information corresponding to each data stream; then groups DMRSs corresponding to the data streams according to a particular method, and maps the grouped DMRSs to corresponding RE positions; and finally sends corresponding port-related information and the data streams to which the DMRSs are added to a terminal device. In this way, when a quantity of data streams is greater than a quantity of DMRS ports of the base station, the base station may group, according to a particular method, DMRSs corresponding to the data streams, and send DMRSs that are corresponding to data streams and are in different groups to a terminal by using the data streams, thereby reducing interference between the DMRSs and improving accuracy in channel estimation performed by a user without increasing time-frequency resources occupied by the DMRSs.

Figure 9:
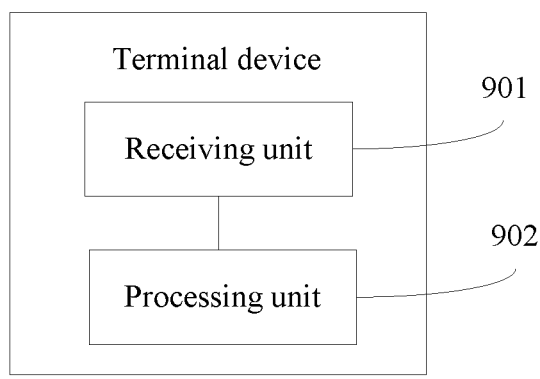
FIG. 9 is a schematic functional diagram of a terminal device according to an embodiment of the present invention.

FIG. 9 is a schematic functional diagram of a terminal device according to an embodiment of the present invention. Referring to FIG. 9, the terminal device includes a receiving unit 901 and a processing unit 902.

The receiving unit 901 is configured to receive port-related information corresponding to DMRSs.

Further, the receiving unit 901 is configured to receive, by using a downlink control channel PDCCH, the port-related information corresponding to the DMRSs.

The processing unit 902 is configured to obtain, according to the port-related information corresponding to the DMRSs, a sequence of RE positions in which the DMRSs are located.

The receiving unit 901 is further configured to receive data streams.

Each of the data streams carries a DMRS.

The processing unit 902 is further configured to acquire, according to the sequence of RE positions, the DMRSs carried in the data streams.

The processing unit 902 is further configured to acquire, according to the DMRSs, channel estimation corresponding to the DMRSs, and modulate the data streams according to the channel estimation corresponding to the DMRSs.

According to the terminal device provided in this embodiment of the present invention, after receiving a sequence of RE positions and data streams that are sent by a base station, the terminal device acquires, according to the sequence of RE positions, DMRSs carried in the data streams, and then acquires, according to the DMRSs, channel estimation corresponding to the DMRSs, so as to modulate the data streams. In this way, when a quantity of data streams is greater than a quantity of DMRS ports of the base station, interference between the DMRSs is reduced and accuracy in channel estimation performed by a user is improved without increasing time-frequency resources occupied by the DMRSs.

Figure 10:
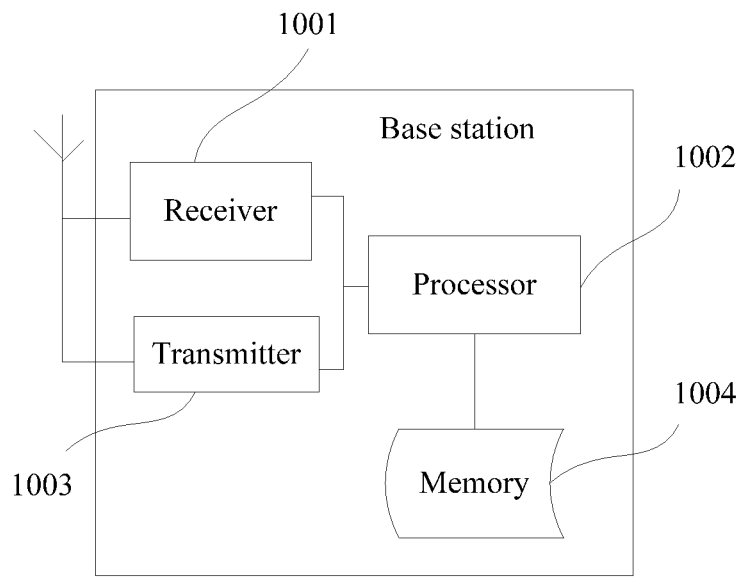
FIG. 10 is a schematic structural diagram of a base station according to an embodiment of the present invention.

FIG. 10 is a schematic structural diagram of a base station according to an embodiment of the present invention. Referring to FIG. 10, the base station includes a receiver 1001, a processor 1002, a transmitter 1003, and a memory 1004.

The receiver 1001 is configured to receive N data streams sent by a network-side device.

The data stream carries a user identity ID, and N is an integer greater than a quantity of DMRS ports of the base station.

The processor 1002 is configured to generate a demodulation reference signal DMRS corresponding to each of the N data streams.

The processor 1002 is further configured to group DMRSs corresponding to the N data streams into M groups.

It should be noted that M is a value of a group quantity that is preset by the base station for grouping the DMRSs.

Further, the processor 1002 is further configured to acquire first information of each of the N data streams according to the user ID.

The first information is related information used for grouping the DMRSs.

Further, the first information includes channel estimation and/or angle-of-arrival information of a terminal device.

Accordingly, the processor 1002 is configured to group the DMRSs corresponding to the N data streams into the M groups according to the first information of each data stream.

Further, a grouping rule in which the processor 1002 groups the DMRSs corresponding to the N data streams into M groups varies with a specific case of the first information.

Specifically, in a first case in which the first information includes the channel estimation, the grouping rule may be a grouping rule based on channel relevance. In this case, the processor 1002 uses two methods, which are specifically as follows:

In a first method, the processor 1002 is configured to determine, according to a value of a group quantity M and a quantity N of the data streams, a maximum quantity of DMRSs contained in each of the M groups.

The processor 1002 is configured to determine whether all the DMRSs corresponding to the N data streams are allocated to the M groups.

The processor 1002 is configured to: in a case in which it is determined that all the DMRSs corresponding to the N data streams are not allocated to the M groups, determine a first DMRS from DMRSs that are corresponding to data streams and are not allocated to the M groups.

The processor 1002 is configured to determine, from the DMRSs that are corresponding to the data streams and are not allocated to the M groups, a DMRS whose channel strength is lowest as the first DMRS.

The processor 1002 is configured to determine any group that is in the M groups and to which no DMRS is allocated as an $i^{th}$ group.

The processor 1002 is configured to allocate the first DMRS to the $i^{th}$ group.

The processor 1002 is configured to update a DMRS channel subspace of the $i^{th}$ group according to a channel of the first DMRS.

The processor 1002 is configured to determine whether a quantity of DMRSs allocated to the $i^{th}$ group reaches a maximum quantity of DMRSs contained in the $i^{th}$ group.

The processor 1002 is configured to: in a case in which the quantity of DMRSs allocated to the $i^{th}$ group does not reach the maximum quantity of DMRSs contained in the $i^{th}$ group, calculate relevance between a channel of each of the DMRSs that are corresponding to the data streams and are not allocated to the M groups and the DMRS channel subspace of the $i^{th}$ group. The processor 1002 is also configured to select, according to the relevance between the channel of each of the DMRSs that are corresponding to the data streams and are not allocated to the M groups and the DMRS channel subspace of the $i^{th}$ group and from the DMRSs that are corresponding to the data streams and are not allocated to the M groups, a DMRS that has least relevance to the DMRS channel subspace of the $i^{th}$ group, and allocate the DMRS to the $i^{th}$ group. The processor 1002 is also configured to continue to perform the determining whether a quantity of DMRSs allocated to the $i^{th}$ group reaches a maximum quantity of DMRSs contained in the $i^{th}$ group, until the quantity of DMRSs allocated to the $i^{th}$ group reaches the maximum quantity of DMRSs contained in the $i^{th}$ group.

Further, the processor 1002 is configured to calculate the relevance between the channel of each of the DMRSs that are corresponding to the data streams and are not allocated to the M groups and the DMRS channel subspace of the $i^{th}$ group according to a formula $h_k P^H (PP^H)^{-1} P h_{kH}/|h_k|^2$, where $h_k$ represents a channel matrix of each of the DMRSs that are corresponding to the data streams and are not allocated to the M groups, $h_{kH}$ represents a transposed matrix of the channel matrix of each of the DMRSs that are corresponding to the data streams and are not allocated to the M groups, P represents a matrix of the DMRS channel subspace of the $i^{th}$ group, and $P^H$ represents a transposed matrix of the matrix of the DMRS channel subspace of the $i^{th}$ group.

The processor 1002 is configured to: in a case in which the quantity of DMRSs allocated to the $i^{th}$ group reaches the maximum quantity of DMRSs contained in the $i^{th}$ group, update the $i^{th}$ group to a DMRS-allocated group in the M groups, and continue to perform the determining whether all the DMRSs corresponding to the N data streams are allocated to the M groups, until it is determined that all the DMRSs corresponding to the N data streams are allocated to the M groups.

In a second method, the processor 1002 is configured to determine, according to a value of a group quantity M and a quantity N of the data streams, a maximum quantity of DMRSs contained in each of the M groups.

The processor 1002 is configured to determine any group that is in the M groups and to which no DMRS is allocated as an $i^{th}$ group.

The processor 1002 is configured to determine whether the $i^{th}$ group is the last group that is in the M groups and to which no DMRS is allocated.

The processor 1002 is configured to: when it is determined that the $i^{th}$ group is not the last group that is in the M groups and to which no DMRS is allocated, determine a first DMRS from DMRSs that are corresponding to data streams and are not allocated to the M groups.

The processor 1002 is configured to determine, from the DMRSs that are corresponding to the data streams and are not allocated to the M groups, a DMRS whose channel strength is lowest as the first DMRS.

The processor 1002 is configured to allocate the first DMRS to the $i^{th}$ group.

The processor 1002 is configured to update a DMRS channel subspace of the $i^{th}$ group according to a channel of the first DMRS.

The processor 1002 is configured to determine whether a quantity of DMRSs allocated to the $i^{th}$ group reaches a maximum quantity of DMRSs contained in the $i^{th}$ group.

The processor 1002 is configured to: in a case in which the quantity of DMRSs allocated to the $i^{th}$ group does not reach the maximum quantity of DMRSs contained in the $i^{th}$ group, calculate relevance between a channel of each of the DMRSs that are corresponding to the data streams and are not allocated to the M groups and the DMRS channel subspace of the $i^{th}$ group. The processor 1002 is configured to select, according to the relevance between the channel of each of the DMRSs that are corresponding to the data streams and are not allocated to the M groups and the DMRS channel subspace of the $i^{th}$ group and from the DMRSs that are corresponding to the data streams and are not allocated to the M groups, a DMRS that has least relevance to the DMRS channel subspace of the $i^{th}$ group, and allocate the DMRS to the $i^{th}$ group. The processor 1002 is also configured to continue to perform the determining whether a quantity of DMRSs allocated to the $i^{th}$ group reaches a maximum quantity of DMRSs contained in the $i^{th}$ group, until the quantity of DMRSs allocated to the $i^{th}$ group reaches the maximum quantity of DMRSs contained in the $i^{th}$ group.

Further, the processor 1002 is configured to calculate the relevance between the channel of each of the DMRSs that are corresponding to the data streams and are not allocated to the M groups and the DMRS channel subspace of the $i^{th}$ group according to a formula $h_k P^H (PP^H)^{-1} P h_{kH}/|h_k|^2$, where $h_k$ represents a channel matrix of each of the DMRSs that are corresponding to the data streams and are not allocated to the M groups, $h_{kH}$ represents a transposed matrix of the channel matrix of each of the DMRSs that are corresponding to the data streams and are not allocated to the M groups, P represents a matrix of the DMRS channel subspace of the $i^{th}$ group, and $P^H$ represents a transposed matrix of the matrix of the DMRS channel subspace of the $i^{th}$ group.

The processor 1002 is configured to: in a case in which the quantity of DMRSs allocated to the $i^{th}$ group reaches the maximum quantity of DMRSs contained in the $i^{th}$ group, update the $i^{th}$ group to a DMRS-allocated group in the M groups, and continue to perform the determining any group that is in the M groups and to which no DMRS is allocated as an $i^{th}$ group.

The processor 1002 is further configured to: when it is determined that the $i^{th}$ group is the last group that is in the M groups and to which no DMRS is allocated, allocate all the unallocated DMRSs corresponding to the N data streams to the $i^{th}$ group.

Further, in the first case, the processor 1002 is further configured to acquire, according to channel estimation of each data stream, channel strength of the DMRS corresponding to each data stream.

Alternatively, in a second case in which the first information includes the channel estimation, the grouping rule may be a grouping rule based on a channel distance. In this case, the processor 1002 uses two methods, which are specifically as follows.

In a first method, the processor 1002 is configured to determine, according to a value of a group quantity M and a quantity N of the data streams, a maximum quantity of DMRSs contained in each of the M groups.

The processor 1002 is configured to determine whether all the DMRSs corresponding to the N data streams are allocated to the M groups.

The processor 1002 is configured to: in a case in which it is determined that all the DMRSs corresponding to the N data streams are not allocated to the M groups, determine a first DMRS from DMRSs that are corresponding to data streams and are not allocated to the M groups.

Further, the processor 1002 is configured to determine, from the DMRSs that are corresponding to the data streams and are not allocated to the M groups, a DMRS whose channel strength is highest as the first DMRS.

The processor 1002 is configured to determine any group that is in the M groups and to which no DMRS is allocated as an $i^{th}$ group.

The processor 1002 is configured to allocate the first DMRS to the $i^{th}$ group.

The processor 1002 is configured to update a DMRS channel subspace of the $i^{th}$ group according to a channel of the first DMRS.

The processor 1002 is configured to determine whether a quantity of DMRSs allocated to the $i^{th}$ group reaches a maximum quantity of DMRSs contained in the $i^{th}$ group.

The processor 1002 is configured to: in a case in which the quantity of DMRSs allocated to the $i^{th}$ group does not reach the maximum quantity of DMRSs contained in the $i^{th}$ group, calculate a distance between a channel of each of the DMRSs that are corresponding to the data streams and are not allocated to the M groups and the DMRS channel subspace of the $i^{th}$ group. The processor 1002 is configured to select, according to the distance between the channel of each of the DMRSs that are corresponding to the data streams and are not allocated to the M groups and the DMRS channel subspace of the $i^{th}$ group and from the DMRSs that are corresponding to the data streams and are not allocated to the M groups, a DMRS whose distance to the DMRS channel subspace of the $i^{th}$ group is longest, and allocate the DMRS to the $i^{th}$ group. The processor 1002 is also configured to continue to perform the determining whether a quantity of DMRSs allocated to the $i^{th}$ group reaches a maximum quantity of DMRSs contained in the $i^{th}$ group, until the quantity of DMRSs allocated to the $i^{th}$ group reaches the maximum quantity of DMRSs contained in the $i^{th}$ group.

Further, the processor 1002 is configured to calculate the distance between the channel of each of the DMRSs that are corresponding to the data streams and are not allocated to the M groups and the DMRS channel subspace of the $i^{th}$ group according to a formula $h_k(I-P_H(PP^H)^{-1}P)h_{kH}$, where $h_k$ represents a channel matrix of each of the DMRSs that are corresponding to the data streams and are not allocated to the M groups, $h_{kH}$ represents a transposed matrix of the channel matrix of each of the DMRSs that are corresponding to the data streams and are not allocated to the M groups, P represents a matrix of the DMRS channel subspace of the $i^{th}$ group, $P^H$ represents a transposed matrix of the matrix of the DMRS channel subspace of the $i^{th}$ group, and I represents an identity matrix.

The processor 1002 is configured to: in a case in which the quantity of DMRSs allocated to the $i^{th}$ group reaches the maximum quantity of DMRSs contained in the $i^{th}$ group, update the $i^{th}$ group to a DMRS-allocated group in the M groups, and continue to perform the determining whether all the DMRSs corresponding to the N data streams are allocated to the M groups, until it is determined that all the DMRSs corresponding to the N data streams are allocated to the M groups.

In a second method, the processor 1002 is configured to determine, according to a value of a group quantity M and a quantity N of the data streams, a maximum quantity of DMRSs contained in each of the M groups.

The processor 1002 is configured to determine any group that is in the M groups and to which no DMRS is allocated as an $i^{th}$ group.

The processor 1002 is configured to determine whether the $i^{th}$ group is the last group that is in the M groups and to which no DMRS is allocated.

The processor 1002 is configured to: when it is determined that the $i^{th}$ group is not the last group that is in the M groups and to which no DMRS is allocated, determine a first DMRS from DMRSs that are corresponding to data streams and are not allocated to the M groups.

Further, the processor 1002 is configured to determine, from the DMRSs that are corresponding to the data streams and are not allocated to the M groups, a DMRS whose channel strength is highest as the first DMRS.

The processor 1002 is configured to allocate the first DMRS to the $i^{th}$ group.

The processor 1002 is configured to update a DMRS channel subspace of the $i^{th}$ group according to a channel of the first DMRS.

The processor 1002 is configured to determine whether a quantity of DMRSs allocated to the $i^{th}$ group reaches a maximum quantity of DMRSs contained in the $i^{th}$ group.

The processor 1002 is configured to: in a case in which the quantity of DMRSs allocated to the $i^{th}$ group does not reach the maximum quantity of DMRSs contained in the $i^{th}$ group, calculate a distance between a channel of each of the DMRSs that are corresponding to the data streams and are not allocated to the M groups and the DMRS channel subspace of the $i^{th}$ group. The processor 1002 is also configured to select, according to the distance between the channel of each of the DMRSs that are corresponding to the data streams and are not allocated to the M groups and the DMRS channel subspace of the $i^{th}$ group and from the DMRSs that are corresponding to the data streams and are not allocated to the M groups, a DMRS whose distance to the DMRS channel subspace of the $i^{th}$ group is longest, and allocate the DMRS to the $i^{th}$ group. The processor 1002 is further configured to continue to perform the determining whether a quantity of DMRSs allocated to the $i^{th}$ group reaches a maximum quantity of DMRSs contained in the $i^{th}$ group, until the quantity of DMRSs allocated to the $i^{th}$ group reaches the maximum quantity of DMRSs contained in the $i^{th}$ group.

Further, the processor 1002 is configured to calculate the distance between the channel of each of the DMRSs that are corresponding to the data streams and are not allocated to the M groups and the DMRS channel subspace of the $i^{th}$ group according to a formula $h_k(I-P^H(PP^H)^{-1}P)h_{kH}$, where $h_k$ represents a channel matrix of each of the DMRSs that are corresponding to the data streams and are not allocated to the M groups, $h_{kH}$ represents a transposed matrix of the channel matrix of each of the DMRSs that are corresponding to the data streams and are not allocated to the M groups, P represents a matrix of the DMRS channel subspace of the $i^{th}$ group, $P^H$ represents a transposed matrix of the matrix of the DMRS channel subspace of the $i^{th}$ group, and I represents an identity matrix.

The processor 1002 is configured to: in a case in which the quantity of DMRSs allocated to the $i^{th}$ group reaches the maximum quantity of DMRSs contained in the $i^{th}$ group, update the $i^{th}$ group to a DMRS-allocated group in the M groups, and continue to perform the determining any group that is in the M groups and to which no DMRS is allocated as an $i^{th}$ group.

The processor 1002 is further configured to: when it is determined that the $i^{th}$ group is the last group that is in the M groups and to which no DMRS is allocated, allocate all the unallocated DMRSs corresponding to the N data streams to the $i^{th}$ group.

Further, in the second case, the processor 1002 is further configured to acquire, according to channel estimation of each data stream, channel strength of the DMRS corresponding to each data stream.

Alternatively, in a third case, the first information includes the angle-of-arrival information of the terminal device.

In this case, the processor 1002 is configured to sort, according to the angle-of-arrival information of the terminal device, the DMRSs corresponding to the N data streams in order of angles of arrival of the terminal device.

The processor 1002 is configured to group the DMRSs that are corresponding to the N data streams and are sorted in order of the angles of arrival of the terminal device into L groups by using DMRSs corresponding to every M data streams as one group, where L=[N/M].

The processor 1002 is configured to cyclically select a first DMRS from each of the L groups according to the angles of arrival of the terminal device, and group the selected first DMRSs into one group until the DMRSs corresponding to the N data streams are grouped into the M groups.

The first DMRS refers to a DMRS corresponding to a minimum or a maximum angle of arrival of the terminal device.

The processor 1002 is further configured to map each group of DMRSs in the M groups to corresponding resource element (RE) positions.

The processor 1002 is further configured to acquire port-related information corresponding to each group of DMRSs.

The port-related information corresponding to each group of DMRSs is in a one-to-one correspondence with a sequence of the RE positions.

The transmitter 1003 is configured to send the port-related information corresponding to each group of DMRSs to the terminal device.

Further, the transmitter 1003 is configured to send the port-related information corresponding to each group of DMRSs to the terminal device by using a physical downlink control channel PDCCH.

The transmitter 1003 is further configured to add each group of DMRSs in the M groups to data streams, and send the data streams to which the DMRSs are added to the terminal device.

According to the base station provided in this embodiment of the present invention, after receiving data streams sent by a network-side device, the base station needs to obtain DMRS information corresponding to each data stream. The base station then groups DMRSs corresponding to the data streams according to a particular method, and maps the grouped DMRSs to corresponding RE positions. The base station finally sends corresponding port-related information and the data streams to which the DMRSs are added to a terminal device. In this way, when a quantity of data streams is greater than a quantity of DMRS ports of the base station, the base station may group, according to a particular method, DMRSs corresponding to the data streams, and send DMRSs that are corresponding to data streams and are in different groups to a terminal by using the data streams, thereby reducing interference between the DMRSs and improving accuracy in channel estimation performed by a user without increasing time-frequency resources occupied by the DMRSs.

Figure 11:
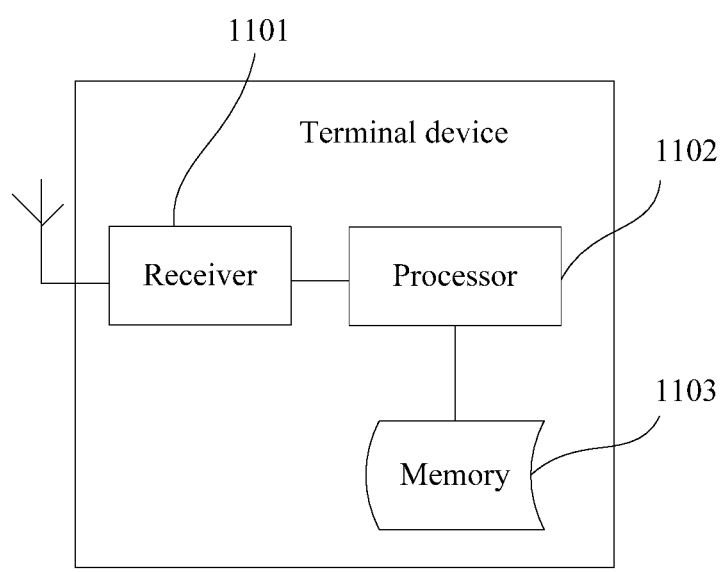
FIG. 11 is a schematic structural diagram of a terminal device according to an embodiment of the present invention.

FIG. 11 is a schematic structural diagram of a terminal device according to an embodiment of the present invention. Referring to FIG. 1i, the terminal device includes a receiver 1101, a processor 1102, and a memory 1103.

The receiver 1101 is configured to receive port-related information corresponding to DMRSs.

Further, the receiver 1101 is configured to receive, by using a downlink control channel PDCCH, the port-related information corresponding to the DMRSs.

The processor 1102 is configured to obtain, according to the port-related information corresponding to the DMRSs, a sequence of RE positions in which the DMRSs are located.

The receiver 1101 is further configured to receive data streams.

Each of the data streams carries a DMRS.

The processor 1102 is further configured to acquire, according to the sequence of RE positions, the DMRSs carried in the data streams.

The processor 1102 is further configured to acquire, according to the DMRSs, channel estimation corresponding to the DMRSs, and modulate the data streams according to the channel estimation corresponding to the DMRSs.

According to the terminal device provided in this embodiment of the present invention, after receiving a sequence of RE positions and data streams that are sent by a base station, the terminal device acquires, according to the sequence of RE positions, DMRSs carried in the data streams, and then acquires, according to the DMRSs, channel estimation corresponding to the DMRSs, so as to modulate the data streams. In this way, when a quantity of data streams is greater than a quantity of DMRS ports of the base station, interference between the DMRSs is reduced and accuracy in channel estimation performed by a user is improved without increasing time-frequency resources occupied by the DMRSs.

Figure 12:
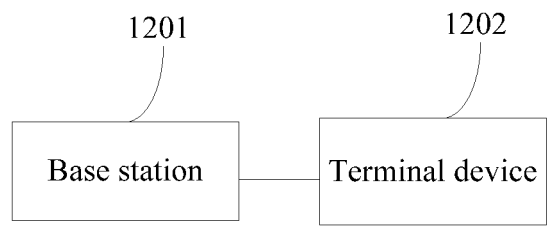
FIG. 12 is a schematic structural diagram of a data processing system according to an embodiment of the present invention.

FIG. 12 is a schematic structural diagram of a data processing system according to an embodiment of the present invention. Referring to FIG. 12, the system includes a base station 1201 and a terminal device 1202.

The base station 1201 is the base station described in the foregoing embodiment.

The terminal device 1202 is the terminal device described in the foregoing embodiment.

According to the data processing system provided in this embodiment of the present invention, after receiving data streams sent by a network-side device, a base station needs to generate DMRS information corresponding to each data stream. The base station then groups DMRSs corresponding to the data streams according to a particular method, and maps the grouped DMRSs to corresponding RE positions. The base station finally sends an RE position sequence and the data streams to which the DMRSs are added to a terminal device. In this way, when a quantity of data streams is greater than a quantity of DMRS ports of the base station, the base station may group DMRSs according to a particular method, and send DMRSs in different groups to a terminal by using the data streams, thereby reducing interference between the DMRSs and improving accuracy in channel estimation performed by a user without increasing time-frequency resources occupied by the DMRSs.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a Read-Only Memory (ROM), a Random Access Memory (RAM), a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A data processing method, comprising:
receiving N data streams sent by a network-side device, wherein the N data streams carry a user identity (ID), and N is an integer greater than a quantity of demodulation reference signal (DMRS) ports of a base station and represents a quantity of the N data streams;
generating a DMRS corresponding to each of the N data streams, thereby generating a plurality of DMRSs, the plurality of DMRSs being non-orthogonal to one another;
grouping the DMRSs corresponding to the N data streams into M groups, each of the M groups comprising a number of DMRSs in the plurality of DMRSs, wherein the DMRSs are grouped into the M groups such that a first DMRS in a first group has less interference with a second DMRS in the first group than with a third DMRS in any of the other groups, and M is an integer representing a group quantity;
mapping each group of DMRSs in the M groups to corresponding resource element (RE) locations;
acquiring port-related information corresponding to each group of DMRSs;
sending the port-related information corresponding to each group of DMRSs to a terminal device;
adding each group of DMRSs in the M groups to data streams; and
sending the data streams to which the DMRSs are added to the terminal device.

2. The method according to claim 1, further comprising:
acquiring a first information of each of the N data streams according to the user ID carried in a corresponding data stream, wherein the first information is related information used for grouping the DMRSs.

3. The method according to claim 2, wherein grouping the DMRSs corresponding to the N data streams into the M groups comprises:
grouping the DMRSs corresponding to the N data streams into the M groups according to the first information of the N data streams.

4. The method according to claim 3, wherein, in response to the first information comprising channel estimation, grouping the DMRSs corresponding to the N data streams into the M groups according to the first information of the N data streams comprises:
determining, according to a value of the group quantity M and the quantity N of the data streams, a maximum quantity of DMRSs included in each of the M groups;
determining whether all the DMRSs corresponding to the N data streams are allocated to the M groups;
in response to all the DMRSs corresponding to the N data streams not being allocated to the M groups, determining a first DMRS from DMRSs that are corresponding to data streams and are not allocated to the M groups;
determining a group that is in the M groups and to which no DMRS is allocated as an ith group;
allocating the first DMRS to the ith group;
updating a DMRS channel subspace of the ith group according to a channel of the first DMRS, wherein a DMRS channel subspace of a group comprises one or more channels of DMRSs in the group; and
determining whether a quantity of DMRSs allocated to the ith group reaches a maximum quantity of DMRSs contained in the ith group.

5. The method according to claim 4, wherein in response to the quantity of the DMRSs allocated to the ith group not reaching the maximum quantity of DMRSs contained in the ith group, the method further comprises:
calculating relevance between a channel of each of DMRSs that are corresponding to the data streams and are not allocated to the M groups and the DMRS channel subspace of the ith group;
selecting, according to the relevance between the channel of each of the DMRSs that are corresponding to the data streams and are not allocated to the M groups and the DMRS channel subspace of the ith group and from the DMRSs that are corresponding to the data streams and are not allocated to the M groups, a DMRS that has least relevance to the DMRS channel subspace of the ith group;
allocating the DMRS to the ith group; and
continuing to perform the determining whether a quantity of DMRSs allocated to the ith group reaches a maximum quantity of DMRSs contained in the ith group, until the quantity of DMRSs allocated to the ith group reaches the maximum quantity of DMRSs contained in the ith group.

6. The method according to claim 4, wherein in response to the quantity of DMRSs allocated to the ith group reaching the maximum quantity of DMRSs contained in the ith group, the method further comprises:
updating the ith group to a DMRS-allocated group in the M groups; and
continuing to perform the determining whether all the DMRSs corresponding to the N data streams are allocated to the M groups, until all the DMRSs corresponding to the N data streams are allocated to the M groups.

7. The method according to claim 3, wherein in response to the first information comprising channel estimation, grouping the DMRSs corresponding to the N data streams into the M groups according to the first information of the N data streams comprises:
determining, according to a value of a group quantity M and a quantity N of the data streams, a maximum quantity of DMRSs contained in each of the M groups;
determining any group that is in the M groups and to which no DMRS is allocated as an ith group;
determining whether the ith group is the last group that is in the M groups and to which no DMRS is allocated;
in response to the ith group not being the last group that is in the M groups and to which no DMRS is allocated, determining a first DMRS from DMRSs that are corresponding to data streams and are not allocated to the M groups;
allocating the first DMRS to the ith group;
updating a DMRS channel subspace of the ith group according to a channel of the first DMRS; and
determining whether a quantity of DMRSs allocated to the ith group reaches a maximum quantity of DMRSs contained in the ith group.

8. The method according to claim 7, wherein in response to the quantity of DMRSs allocated to the ith group not reaching the maximum quantity of DMRSs contained in the ith group, the method further comprises:
  calculating relevance between a channel of each of the DMRSs that are corresponding to the data streams and are not allocated to the M groups and the DMRS channel subspace of the ith group;
  selecting, according to the relevance between the channel of each of the DMRSs that are corresponding to the data streams and are not allocated to the M groups and the DMRS channel subspace of the ith group and from the DMRSs that are corresponding to the data streams and are not allocated to the M groups, a DMRS that has least relevance to the DMRS channel subspace of the ith group;
  allocating the DMRS to the ith group; and
  continuing to perform the determining whether a quantity of DMRSs allocated to the ith group reaches a maximum quantity of DMRSs contained in the ith group, until the quantity of DMRSs allocated to the ith group reaches the maximum quantity of DMRSs contained in the ith group.

9. The method according to claim 7, wherein in response to the quantity of DMRSs allocated to the ith group reaching the maximum quantity of DMRSs contained in the ith group, the method further comprises:
  updating the ith group to a DMRS-allocated group in the M groups; and
  continuing to perform the determining any group that is in the M groups and to which no DMRS is allocated as an ith group.

10. The method according to claim 4, further comprising:
  acquiring, according to channel estimation of each data stream, channel strength of a corresponding DMRS; and
  the determining a first DMRS from DMRSs that are corresponding to data streams and are not allocated to the M groups comprises:
    determining, from the DMRSs that are corresponding to the data streams and are not allocated to the M groups, a DMRS whose channel strength is lowest as the first DMRS.

11. The method according to claim 2, wherein in response to the first information comprising channel estimation, grouping the DMRSs corresponding to the N data streams into the M groups according to the first information of the N data streams comprises:
  determining, according to a value of a group quantity M and a quantity N of the data streams, a maximum quantity of DMRSs contained in each of the M groups;
  determining whether all the DMRSs corresponding to the N data streams are allocated to the M groups;
  in response to all the DMRSs corresponding to the N data streams not being allocated to the M groups, determining a first DMRS from DMRSs that are corresponding to data streams and are not allocated to the M groups;
  determining any group that is in the M groups and to which no DMRS is allocated as an ith group;
  allocating the first DMRS to the ith group;
  updating a DMRS channel subspace of the ith group according to a channel of the first DMRS;
  determining whether a quantity of DMRSs allocated to the ith group reaches a maximum quantity of DMRSs contained in the ith group; and
  in response to the quantity of DMRSs allocated to the ith group not reaching the maximum quantity of DMRSs contained in the ith group:
    calculating a distance between a channel of each of the DMRSs that are corresponding to the data streams and are not allocated to the M groups and the DMRS channel subspace of the ith group;
    selecting, according to the distance between the channel of each of the DMRSs that are corresponding to the data streams and are not allocated to the M groups and the DMRS channel subspace of the ith group and from the DMRSs that are corresponding to the data streams and are not allocated to the M groups, a DMRS whose distance to the DMRS channel subspace of the ith group is longest;
    allocating the DMRS to the ith group; and
    continuing to perform the determining whether a quantity of DMRSs allocated to the ith group reaches a maximum quantity of DMRSs contained in the ith group, until the quantity of DMRSs allocated to the ith group reaches the maximum quantity of DMRSs contained in the ith group; or
  in response to the quantity of DMRSs allocated to the ith group reaching the maximum quantity of DMRSs contained in the ith group:
    updating the ith group to a DMRS-allocated group in the M groups; and
    continuing to perform the determining whether all the DMRSs corresponding to the N data streams are allocated to the M groups, until all the DMRSs corresponding to the N data streams are allocated to the M groups.

12. The method according to claim 2, wherein in response to the first information comprising channel estimation, grouping the DMRSs corresponding to the N data streams into the M groups according to the first information of the N data streams comprises:
  determining, according to a value of a group quantity M and a quantity N of the data streams, a maximum quantity of DMRSs contained in each of the M groups;
  determining any group that is in the M groups and to which no DMRS is allocated as an ith group;
  determining whether the ith group is the last group that is in the M groups and to which no DMRS is allocated;
  when the ith group is not the last group that is in the M groups and to which no DMRS is allocated, determining a first DMRS from DMRSs that are corresponding to data streams and are not allocated to the M groups;
  allocating the first DMRS to the ith group;
  updating a DMRS channel subspace of the ith group according to a channel of the first DMRS;
  determining whether a quantity of DMRSs allocated to the ith group reaches a maximum quantity of DMRSs contained in the ith group; and
  in response to the quantity of DMRSs allocated to the ith group not reaching the maximum quantity of DMRSs contained in the ith group;
    calculating a distance between a channel of each of the DMRSs that are corresponding to the data streams and are not allocated to the M groups and the DMRS channel subspace of the ith group;
    selecting, according to the distance between the channel of each of the DMRSs that are corresponding to the data streams and are not allocated to the M groups and the DMRS channel subspace of the ith group and from the DMRSs that are corresponding to the data streams and are not allocated to the M groups, a DMRS whose distance to the DMRS channel subspace of the ith group is longest;
    allocating the DMRS to the ith group; and continuing to perform the determining whether a quantity of DMRSs allocated to the ith group reaches a maximum quantity of DMRSs contained in the ith group, until the quantity of DMRSs allocated to the ith group reaches the maximum quantity of DMRSs contained in the ith group; or in response to the quantity of DMRSs allocated to the ith group reaching the maximum quantity of DMRSs contained in the ith group:

updating the ith group to a DMRS-allocated group in the M groups; and continuing to perform the determining any group that is in the M groups and to which no DMRS is allocated as an ith group.

13. The method according to claim ii, further comprising:
acquiring, according to channel estimation of each data stream, channel strength of a corresponding DMRS, wherein the determining the first DMRS from DMRSs that are corresponding to data streams and are not allocated to the M groups comprises:
determining, from the DMRSs that are corresponding to the data streams and are not allocated to the M groups, a DMRS whose channel strength is highest as the first DMRS.

14. The method according to claim 2, wherein
in response to the first information comprising angle-of-arrival information of the terminal device, grouping the DMRSs corresponding to the N data streams into the M groups according to the first information of the N data streams comprises:
sorting, according to the angle-of-arrival information of the terminal device, the DMRSs corresponding to the N data streams in order of angles of arrival of the terminal device;
grouping the DMRSs that are corresponding to the N data streams and are sorted in order of the angles of arrival of the terminal device into L groups by using DMRSs corresponding to every M data streams as one group, wherein L=[N/M]; and
cyclically selecting a first DMRS from each of the L groups according to the angles of arrival of the terminal device, and grouping the selected first DMRSs into one group until the DMRSs corresponding to the N data streams are grouped into the M groups.

15. The method according to claim 14, wherein
the first DMRS refers to a DMRS corresponding to a minimum or a maximum angle of arrival of the terminal device.

16. A base station, comprising:
a processor; and
a non-transitory computer-readable storage medium storing a program to be executed by the processor, the program including instructions to:
receive N data streams sent by a network-side device, wherein the N data streams carry a user identity (ID), and N is an integer greater than a quantity of demodulation reference signal (DMRS) ports of the base station;
generate a DMRS corresponding to each of the N data streams, thereby generating a plurality of DMRSs, the plurality of DMRSs being non-orthogonal to one another;
group the DMRSs corresponding to the N data streams into M groups, each of the M groups comprising a number of DMRSs in the plurality of DMRSs, wherein the DMRSs are grouped into the M groups such that a first DMRS in a first group has less interference with a second DMRS in the first group than with a third DMRS in a second group, and M is an integer representing a group quantity;
map each group of DMRSs in the M groups to corresponding resource element (RE) positions;
acquire port-related information corresponding to each group of DMRSs;
send the port-related information corresponding to each group of DMRSs to a terminal device; and
add each group of DMRSs in the M groups to data streams, and send the data streams to which the DMRSs are added to the terminal device.

17. The base station according to claim 16, wherein the program further includes instructions to acquire a first information of each of the N data streams according to the user ID of a corresponding data stream, wherein the first information is related information used for grouping the DMRSs, and
to group the DMRSs corresponding to the N data streams into the M groups according to the first information that is of each data stream.

18. The base station according to claim 17, wherein the first information comprises at least one of channel estimation or angle-of-arrival information of the terminal device.

19. A terminal device, comprising:
a processor; and
a non-transitory computer-readable storage medium storing a program to be executed by the processor, the program including instructions to:
receive port-related information corresponding to demodulation reference signals (DMRSs), the DMRSs being selected from a plurality of DMRSs that are non-orthogonal from one another, wherein the DMRSs are selected by grouping the plurality of DMRSs into a number of DMRS groups such that a first DMRS in a first group has less interference with a second DMRS in the first group than with a third DMRS in any of the other groups, and wherein the DMRSs belong to a same group and are mapped to a sequence of resource element (RE) positions;
obtain, according to the port-related information corresponding to the DMRSs, the sequence of RE positions in which the DMRSs are located;
receive a data stream carrying a DMRS;
acquire, according to the sequence of RE positions, the DMRSs carried in the data stream; and
acquire, according to the DMRSs, channel estimation corresponding to the DMRSs, and modulate the data stream according to the channel estimation corresponding to the DMRSs.

20. The terminal device according to claim 19, wherein the program further includes instructions to receive, by using a downlink control channel PDCCH, the port-related information corresponding to the DMRSs.

* * * * *

UNITED STATES PATENT AND TRADEMARK OFFICE
CERTIFICATE OF CORRECTION

PATENT NO. : 10,063,355 B2
APPLICATION NO. : 15/192832
DATED : August 28, 2018
INVENTOR(S) : Deli Qiao Page 1 of 1

It is certified that error appears in the above-identified patent and that said Letters Patent is hereby corrected as shown below:

In Column 41, Line 15, Claim 13, delete "claim ii" and insert --claim 11--.

Signed and Sealed this
Twenty-third Day of October, 2018

Andrei Iancu
*Director of the United States Patent and Trademark Office*